(12) United States Patent
Kadohara

(10) Patent No.: US 10,348,955 B2
(45) Date of Patent: Jul. 9, 2019

(54) IMAGING APPARATUS, CONTROL METHOD, AND STORAGE MEDIUM FOR TRACKING AN IMAGING TARGET IN A CONTINUOUS SHOOTING OPERATION

(71) Applicant: CANON KABUSHIKI KAISHA, Tokyo (JP)

(72) Inventor: Terutake Kadohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/405,174

(22) Filed: Jan. 12, 2017

(65) Prior Publication Data

US 2017/0208240 A1 Jul. 20, 2017

(30) Foreign Application Priority Data

Jan. 15, 2016 (JP) .................... 2016-006447

(51) Int. Cl.
| | |
|---|---|
| *G03B 13/00* | (2006.01) |
| *H04N 5/232* | (2006.01) |
| *G06T 7/571* | (2017.01) |
| *H04N 5/225* | (2006.01) |
| *G02B 7/34* | (2006.01) |
| *G06T 1/00* | (2006.01) |
| *H04N 5/335* | (2011.01) |

(52) U.S. Cl.
CPC .......... *H04N 5/23212* (2013.01); *G02B 7/34* (2013.01); *G06T 1/0007* (2013.01); *G06T 7/571* (2017.01); *H04N 5/2254* (2013.01); *H04N 5/23296* (2013.01); *H04N 5/2258* (2013.01); *H04N 5/335* (2013.01)

(58) Field of Classification Search
CPC .............. H04N 5/2254; H04N 5/2258; H04N 5/23212; H04N 5/23296; H04N 5/335; G02B 7/34; G06T 7/571
USPC .......................................... 348/345, 349–351
See application file for complete search history.

(56) References Cited

U.S. PATENT DOCUMENTS

| | | | | |
|---|---|---|---|---|
| 7,136,581 | B2* | 11/2006 | Fujii | ........ H04N 5/23212 396/54 |
| 8,253,800 | B2* | 8/2012 | Takeuchi | ........ G01S 3/7864 348/169 |
| 9,420,159 | B2* | 8/2016 | Hamada | ....... H04N 5/23212 |

FOREIGN PATENT DOCUMENTS

JP  8-75999 A  3/1996

* cited by examiner

*Primary Examiner* — Ngoc Yen T Vu
(74) *Attorney, Agent, or Firm* — Canon U.S.A., Inc. I.P. Division

(57) ABSTRACT

There is provided an imaging apparatus for continuously performing a plurality of photographing operations. The imaging apparatus includes an AF sensor and an image sensor. A microcomputer performs focal point detection (i.e., defocus amount calculation) processing based on a signal acquired by the AF sensor. Further, the microcomputer performs focal point detection processing based on a signal acquired by the image sensor. The microcomputer selects one of two focal point detection results and performs a control to drive a focusing lens in a lens drive 1 and a lens drive 2.

25 Claims, 15 Drawing Sheets

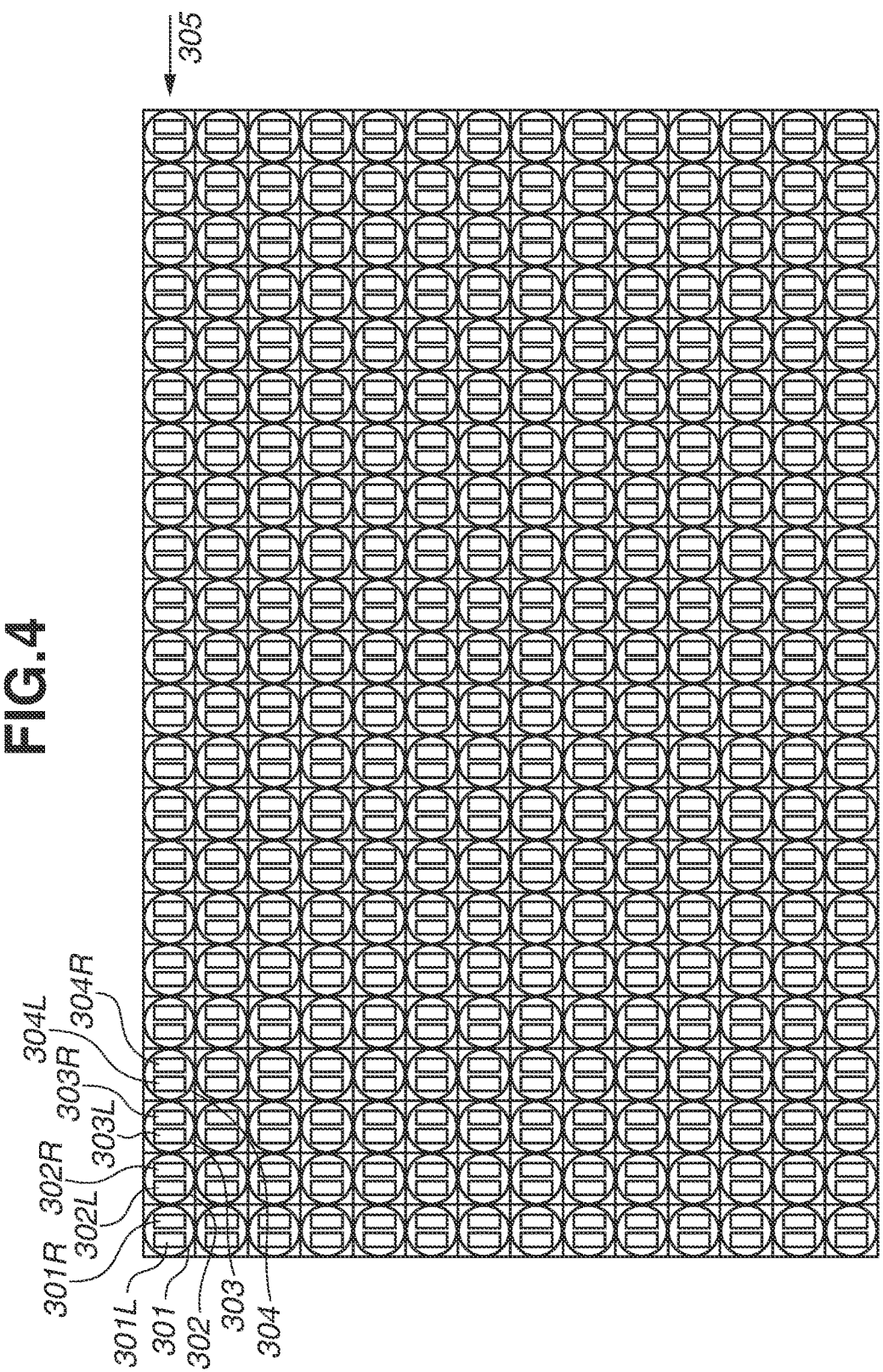

IMAGING APPARATUS, CONTROL METHOD, AND STORAGE MEDIUM FOR TRACKING AN IMAGING TARGET IN A CONTINUOUS SHOOTING OPERATION

BACKGROUND OF THE INVENTION

Field of the Invention

The present invention relates to an imaging apparatus. More particularly, the present invention relates to a technique capable of tracking an imaging target in a continuous shooting operation.

Description of the Related Art

A continuous shooting includes a plurality of photographing operations successively performed. A technique capable of driving a lens while predicting the movement of a moving imaging target in such a continuous shooting is conventionally known. For example, the method discussed in Japanese Patent Application Laid-Open No. 8-75999 includes storing a plurality of previously acquired focal point detection results, selecting an optimum mathematical function that predicts a future image surface position of an imaging target, and continuously adjusting the focus on an imaging target (namely, tracking the imaging target) by driving a focusing lens according to the selected mathematical function. The tracking can be defined as an operation for driving the focusing lens in such a way as to adjust the focus on a moving imaging target.

The method discussed in Japanese Patent Application Laid-Open No. 8-75999 does not include any lens driving performed after completing a photographing operation and before starting the next focal point detection. If the imaging target is a moving object, a moving distance of the imaging target during a time interval between the photographing operation and the next focal point detection will not be negligible. In this case, if the moving speed of the imaging target is higher, the imaging target image surface position will greatly change during the time interval between the photographing operation and the next focal point detection although it depends on the position or moving direction of the imaging target, compared to a case where the speed is lower. In the continuous shooting, it is required to drive the focusing lens in a limited time (i.e., during the time interval between the focal point detection and the photographing operation). Therefore, if the imaging target image surface position changes greatly, it may be difficult to sufficiently drive the focusing lens by a required drive amount calculated based on a focal point detection result.

In view of the foregoing, prior to the driving of the focusing lens after completing the next focal point detection, a lens driving is performed preliminarily based on a previously acquired focal point detection result after completing the photographing operation and before starting the next focal point detection. In this case, it becomes feasible to improve the imaging target tracking accuracy by the driving of the focusing lens performed after completing the focal point detection and before starting the photographing operation.

When the driving of the focusing lens is performed before starting the next focal point detection as mentioned above, a significant time has already passed since the previous focal point detection. If the focal point detection timing deviates greatly from the timing for driving the focusing lens based on the focal point detection result, there will be a great difference between an imaging target position at the focal point detection timing and an imaging target position at the focusing lens driving timing. Accordingly, the imaging target tracking accuracy may deteriorate if the previously acquired focal point detection result is used.

SUMMARY OF THE INVENTION

The present disclosure intends to provide an imaging apparatus that can track an imaging target accurately, compared to the conventional technique. Further, the present disclosure intends to provide a method for controlling such an imaging apparatus, a related program, and a storage medium.

According to an aspect of the present invention, an imaging apparatus can continuously perform a plurality of photographing operations. The imaging apparatus includes a first image sensor configured to perform at least a first photographing operation and a second photographing operation successively to acquire a signal that can be used to generate a recording image, a focal point detection unit configured to perform first focal point detection processing and second focal point detection processing successively, wherein the first focal point detection processing is operated between the first photographing operation and the second focal point detection processing, and wherein the second focal point detection processing is operated between the first focal point detection processing and the second photographing operation, and a control unit configured to control a first lens drive for driving of a focusing lens based on a result obtained through the first focal point detection processing, and control a second lens drive for driving the focusing lens based on a result obtained through the second focal point detection processing, wherein the first focal point detection processing is performed by using the signal acquired from the first image sensor in the first photographing operation.

Further features of the present disclosure will become apparent from the following description of exemplary embodiments with reference to the attached drawings.

BRIEF DESCRIPTION OF THE DRAWINGS

FIG. 4 illustrates an exemplary configuration of a pixel alignment section provided in the image sensor.

DESCRIPTION OF THE EMBODIMENTS

Hereinafter, preferred embodiments of the present invention will be described in detail below with reference to attached drawings.

[Configuration of Camera Body and Photographing Lens]

Figure 1:
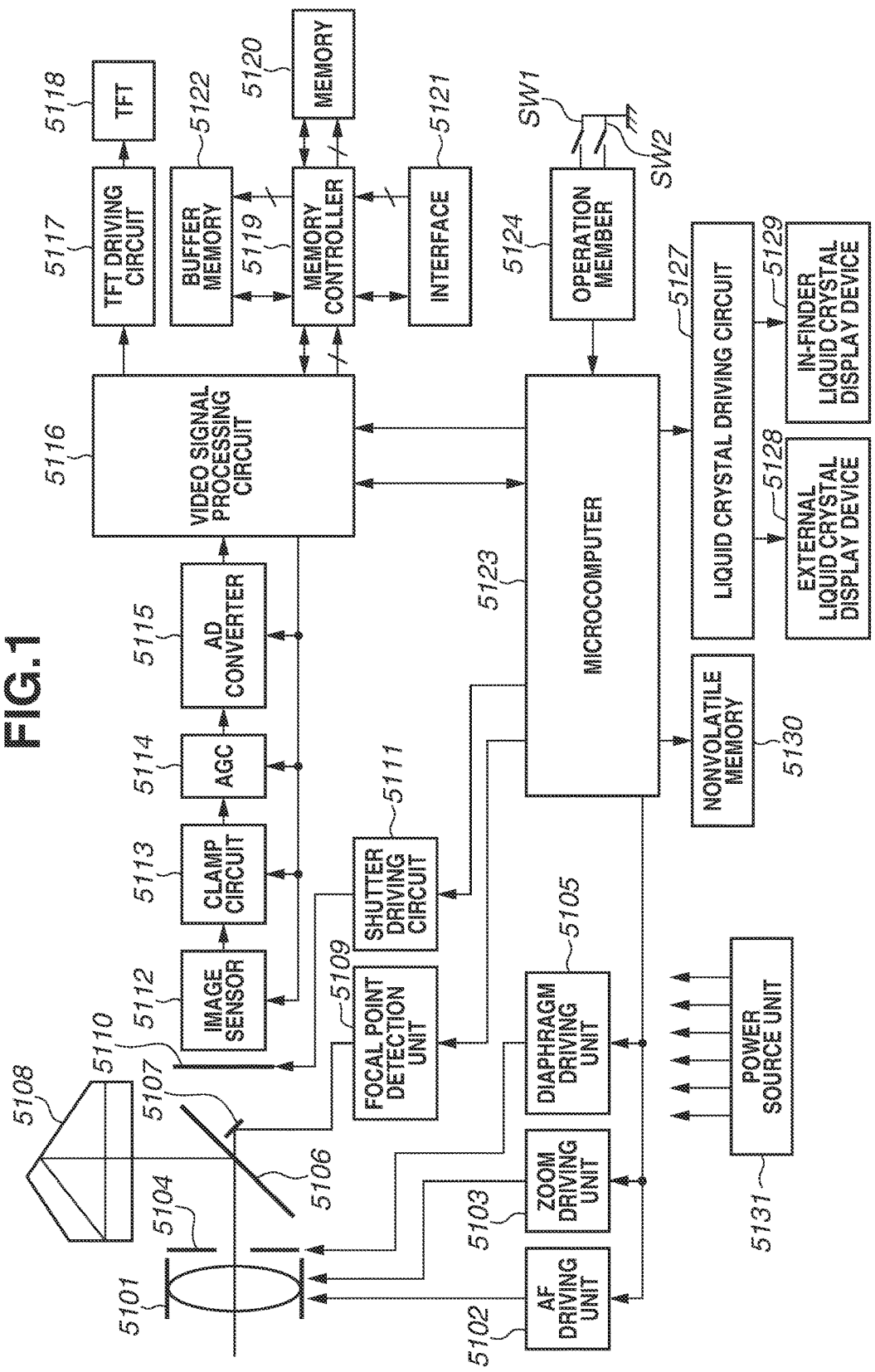
FIG. 1 is a block diagram illustrating an exemplary configuration of a camera body and a photographing lens.

FIG. 1 is a block diagram illustrating a configuration of a digital single-lens reflex camera according to a first exemplary embodiment.

A main mirror 5106 splits a light flux entered via a photographing lens 5101 into one light flux traveling toward a finder and another light flux traveling toward an image sensor 5112. In an ordinary state, the main mirror 5106 is stationarily disposed in such a way as to reflect and guide the light flux toward the finder. However, when the camera performs a photographing operation, the main mirror 5106 is raised upward until the main mirror 5106 retracts from a photographing optical path, so that the light flux can be fully guided toward the image sensor 5112. The main mirror 5106 is a half mirror with a central portion via which a part of light can pass through the main mirror 5106. Therefore, the transmitted part of the light flux can reach an AF sensor 101 that performs focal point detection. In the present exemplary embodiment, the focal point detection is equivalent to calculating a defocus amount.

A sub mirror 5107 reflects the light flux having transmitted through the main mirror 5106 in such a way as to guide the reflected light flux toward the AF sensor 101 provided in a focal point detection unit 5109. A microcomputer 5123 can detect an image shift amount based on the light flux received by the AF sensor 101. The microcomputer 5123 calculates the defocus amount by multiplying the detected image shift amount by a coefficient. The microcomputer 5123 calculates a drive amount for a focusing lens constituting the photographing lens 5101 based on the calculated defocus amount. Further, in the present exemplary embodiment, the microcomputer 5123 can obtain the defocus amount by calculating an output of the image sensor 5112 as described in detail below. The microcomputer 5123 evaluates the calculation result (namely, determines reliability) and instructs an AF driving unit 5102 to drive the focusing lens of the photographing lens.

For example, the AF driving unit 5102 can be constituted by a DC motor or a stepping motor. The microcomputer 5123 controls the AF driving unit 5102 to change the position of the focusing lens of the photographing lens 5101 in such a way as to bring the focusing lens into an in-focus state.

A zoom driving unit 5103 can be configured, for example, by a DC motor or a stepping motor. The microcomputer 5123 controls the zoom driving unit 5103 to change the position of a variable power lens of the photographing lens 5101 in such a way as to adjust a focal length of the photographing lens 5101.

An aperture driving unit 5105 can drive an aperture 5104. The microcomputer 5123 can calculate a drive amount of the aperture 5104 to change an optical aperture value. More specifically, the camera determines the aperture value and the lens performs required setting according to an instruction (i.e., a command) from the camera.

A pentaprism 5108 is a part of the finder. Although not illustrated, the finder includes a focusing plate and an eyepiece lens. Further, a photometry sensor (not illustrated) can receive a light flux from a part of the pentaprism 5108.

A shutter driving circuit 5111 can drive a focal plane shutter 5110. The microcomputer 5123 controls the opening time of the shutter.

The image sensor 5112 can be constituted by a Charge Coupled Device (CCD) sensor or a Complementary Metal Oxide Semiconductor (CMOS) sensor. The image sensor 5112 converts an image of an imaging target formed by the photographing lens 5101 into an electric signal. As mentioned above, in the present exemplary embodiment, the camera can perform focal point detection processing by using not only a signal acquired by the AF sensor 101 but also a signal acquired by the image sensor 5112. The focal point detection will be described in detail below.

A clamp circuit 5113 and an AGC circuit 5114 can perform fundamental processing for an analog signal to be subjected to A/D conversion processing. The microcomputer 5123 changes a clamp level and an AGC reference level.

An A/D converter 5115 can convert the analog signal output from the image sensor 5112 into a digital signal. The converted signal is an image signal representing a photographing result and is also a signal usable in the focal point detection.

A video signal processing circuit 5116 can be realized by a logic device (e.g., a gate array). The video signal processing circuit 5116 performs filter processing, color conversion processing, and gamma processing on digitalized image data. Further, the video signal processing circuit 5116 can perform joint photographic experts group (JPEG) (or any other appropriate) compression processing on the digitalized image data. The video signal processing circuit 5116 outputs the processed data to a memory controller 5119. The video signal processing circuit 5116 can output a video signal obtained by the image sensor 5112 or image data inversely entered from the memory controller 5119 to a thin film transistor (TFT) (liquid crystal) monitor 5118 via a TFT driving circuit 5117. The microcomputer 5123 instructs the video signal processing circuit 5116 to switch the above-mentioned functions. If necessary, the video signal processing circuit 5116 can output exposure information or white balance information about the signal obtained by the image sensor 5112 to the microcomputer 5123. The microcomputer 5123 instructs white balance adjustment and gain adjustment based on the obtained information. In a case where the camera performs a continuous shooting operation, the video signal processing circuit 5116 stores photographing data in a buffer memory 5122 without processing a captured image. The video signal processing circuit 5116 reads unprocessed image data from the buffer memory 5122 via the memory controller 5119. Then, the video signal processing circuit 5116 performs image processing and compression processing on the read data to accomplish the continuous shooting operation. The size or capacity of the buffer memory substantially limits the number of images that can be processed in the same continuous shooting operation.

The memory controller 5119 stores unprocessed digital image data received from the video signal processing circuit 5116 in the buffer memory 5122 and stores processed digital image data in a memory 5120. Further, the memory controller 5119 can inversely output image data from the buffer memory 5122 or the memory 5120 to the video signal processing circuit 5116. The memory 5120 can be a detachable memory. The memory controller 5119 can output the image stored in the memory 5120 to an external computer (or apparatus) via an external interface 5121.

An operation member 5124 can transmit an operational state thereof to the microcomputer 5123. The microcomputer 5123 can control each unit according to a change of the operation member 5124.

Two switches SW1 and SW2 are associated with a release button and can turn on or off in response to the release button. Respective switches SW1 and SW2 are input switches of the operation member 5124. If the release button is incompletely pressed, only the switch SW1 turns on. In this state, the camera performs an automatic focusing operation and a photometry operation. If the release button is fully pressed, both the switch SW1 and the switch SW2 turn on. In other words, the release button is in ON state to record an image. In this state, the camera performs a photographing operation. Further, in the present exemplary embodiment, the camera performs a continuous shooting operation on condition that both the switch SW1 and the switch SW2 are kept in ON state.

Although not illustrated, various kinds of switches, such as an ISO setting button, an image size setting button, an image quality setting button, and an information display button, are connected to the operation member 5124. The operational state of each switch can be detected by the operation member 5124 and can be transmitted to the microcomputer 5123.

A liquid crystal driving circuit 5127 can drive an external liquid crystal display device 5128 and an in-finder liquid crystal display device 5129 according to a display content command, which can be supplied from the microcomputer 5123. Further, although not illustrated, the in-finder liquid crystal display device 5129 is equipped with a backlight (e.g., LED). The liquid crystal driving circuit 5127 can drive the backlight LED. The microcomputer 5123 can calculate the remaining number of images that can be photographed based on image size data predicted according to ISO sensitivity, image size, and image quality, which have been set beforehand, while causing the memory controller 5119 to confirm the capacity of the memory. If necessary, the calculated remaining number can be displayed on the external liquid crystal display device 5128 and the in-finder liquid crystal display device 5129.

A nonvolatile memory (EEPROM) 5130 can store data even in a state where no power is supplied to the camera.

A power source unit 5131 can supply a required amount of electric power to each IC or each driving system.

Figure 2:
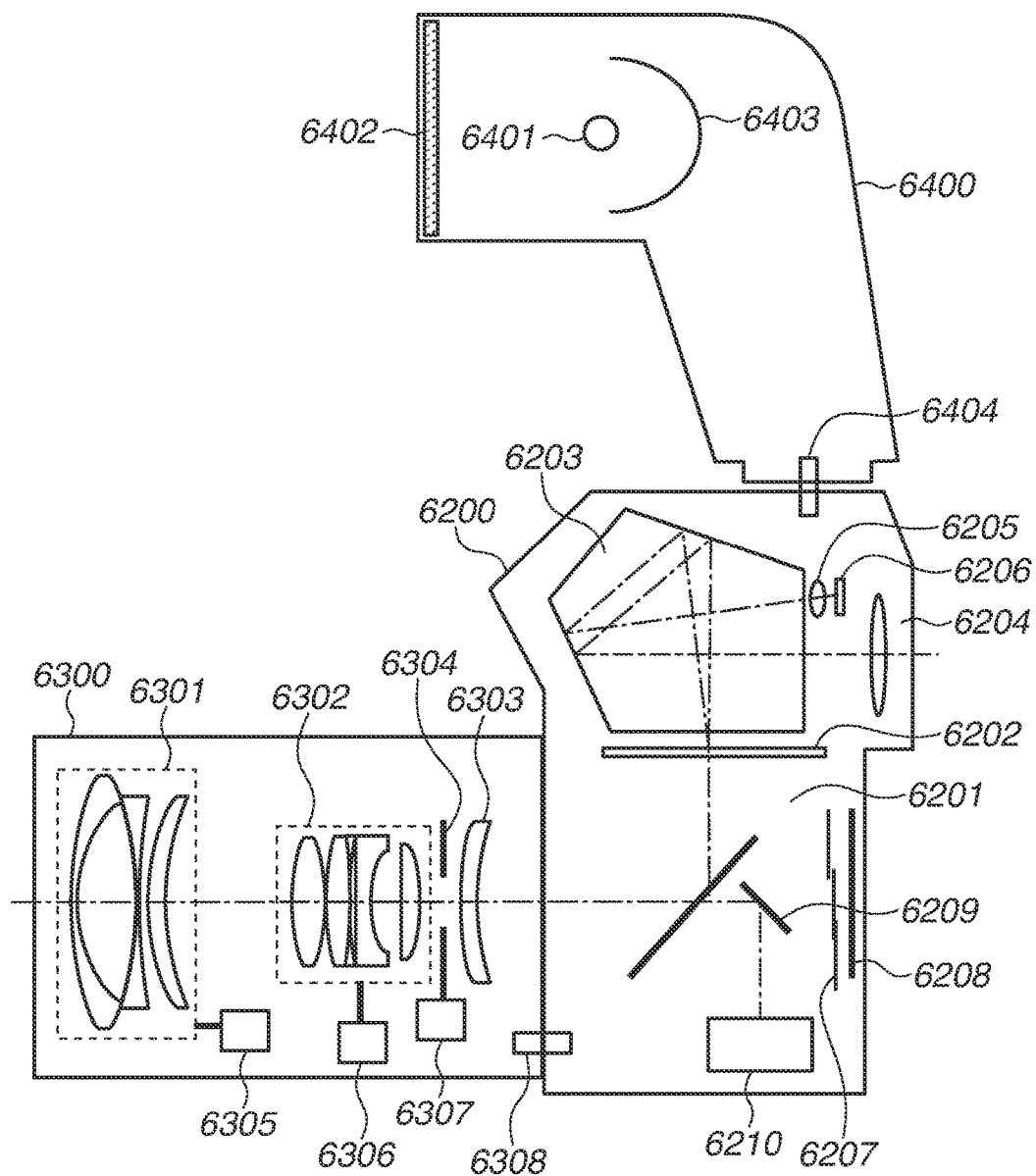
FIG. 2 illustrates an optical arrangement of the camera body, the photographing lens, and a stroboscopic apparatus.

FIG. 2 illustrates an optical arrangement of a single-lens reflex digital camera according to the first exemplary embodiment, which includes a camera body 6200, a photographing lens 6300, and a stroboscopic apparatus 6400.

First, an exemplary configuration of the camera body 6200 will be described in detail below.

Optical components, mechanical components, electric circuits, and an image sensor are accommodated in the camera body 6200, so that a photographing or image-capturing (i.e., recording image acquisition) operation can be performed.

In FIG. 2, a main mirror 6201 (corresponding to the main mirror 5106 illustrated in FIG. 1) is inclined and disposed on the photographing optical path in a finder observation state and retracts from the photographing optical path in a photographing state. The main mirror 6201 is a half mirror, which can guide a light flux to a focal point detection optical system (described below) when the main mirror 6201 is kept in the inclined state on the photographing optical path, so that a beam from an imaging target can partly transmit through the main mirror 6201.

A focusing plate 6202 constitutes a part of a finder optical system and is disposed on a predetermined imaging plane of the photographing lens 6300 (corresponding to the photographing lens 5101 illustrated in FIG. 1). A pentaprism 6203 (i.e., the pentaprism 5108 illustrated in FIG. 1) can change a finder optical path. A photographer can observe a photographing screen by observing the focusing plate 6202 via a window located behind an eyepiece lens 6204.

A photometry sensor 6206 is a sensor that can measure the luminance of an imaging target in a finder observation screen. An image formation lens 6205 associates the focusing plate 6202 and the photometry sensor 6206 in a conjugated relationship via a reflection optical path in the pentaprism 6203. When a focal plane shutter 6207 (i.e., the focal plane shutter 5110 illustrated in FIG. 1) is opened, an image sensor 6208 (i.e., the image sensor 5112 illustrated in FIG. 1) can perform an image capturing operation (i.e., a recording image signal acquisition operation). The image sensor 6208 can be constituted by a CCD sensor or a CMOS sensor. The image sensor 6208 is disposed on the predetermined imaging plane of the photographing lens 6300.

Similar to the main mirror 6201, a sub mirror 6209 (i.e., the sub mirror 5107 illustrated in FIG. 1) is inclined and disposed on the photographing optical path in the finder observation state and retracts from the photographing optical path in the photographing state. The sub mirror 6209 reflects the beam having transmitted through the inclined main mirror 6201 downward in such a way as to guide the beam toward a focal point detection unit 6210.

The focal point detection unit 6210 includes a focal point detection optical system (described below) and the AF sensor 101 that serves as a focal point detection sensor that constitutes a part of the system. Further, the focal point detection unit 6210 includes the focal point detection unit 5109 illustrated in FIG. 1. Further, the focal point detection unit 6210 includes a field mask 307, a field lens 311, an AF aperture 308, and a secondary image formation lens 309, which will be described in detail below. The focal point detection unit 6210 can detect a focus adjustment state of the photographing lens 6300 according to the phase difference detection method and can transmit a detection result to the camera controlling microcomputer 5123 that controls a mechanism for adjusting the focal point of the photographing lens.

Next, an exemplary configuration of the photographing lens 6300 will be described in detail below.

In FIG. 2, a 1-group lens 6301 is a focusing lens that is disposed on the optical axis and movable back and forth in such a way as to adjust a focus position of the photographing screen. A 2-group lens 6302 is a variable power lens that is disposed on the optical axis and movable back and forth in such a way as to change a focal length of the photographing lens 6300 and realize variable power of the photographing screen. A 3-group lens 6303 is a fixed lens.

An AF driving unit 6305 can move the 1-group lens 6301 (i.e., the focusing lens) in the optical axis direction. The AF driving unit 6305 is constituted by a DC motor or a stepping motor, which can perform an AF operation to move the 1-group lens 6301 in the back and forth direction. A zoom driving unit 6306 is constituted by a DC motor or a stepping motor, which can move the 2-group lens 6302 (i.e., the variable power lens) back and forth on the optical axis direction.

An aperture driving unit 6307 is constituted by a DC motor or a stepping motor, which can drive an aperture 6304 (i.e., the aperture 5104 illustrated in FIG. 1) in such a way as to change an aperture diameter thereof.

A lens mount contact group 6308 is a communication interface provided between the camera body 6200 and the photographing lens 6300.

Next, an exemplary configuration of the stroboscopic apparatus 6400 will be described in detail below. The stroboscopic apparatus 6400 is attachable to and detachable from the camera body 6200. The stroboscopic apparatus 6400 can control light emission based on a signal sent from the camera body 6200.

In FIG. 2, a xenon flash tube 6401 can convert electric current energy into light emission energy. A Fresnel lens 6402 and a reflection plate 6403 can efficiently converge the light emission energy on an imaging target. A stroboscopic contact group 6404 is provided at a hot shoe serving as a communication interface between the camera body 6200 and the stroboscopic apparatus 6400.

[Configuration of Image Sensor]

Figure 3A:
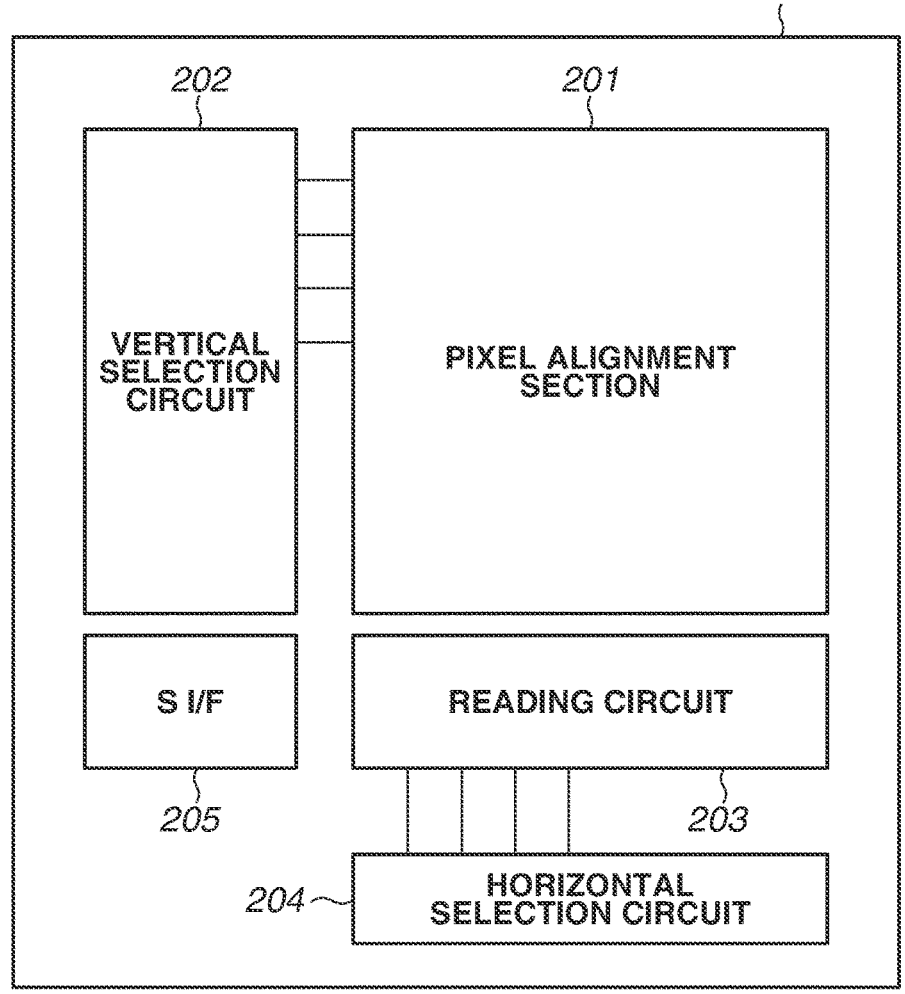
FIG. 3A is a circuit diagram illustrating an image sensor and FIG. 3B illustrates an exemplary configuration of a pixel portion included in the image sensor.
Figure 3B:
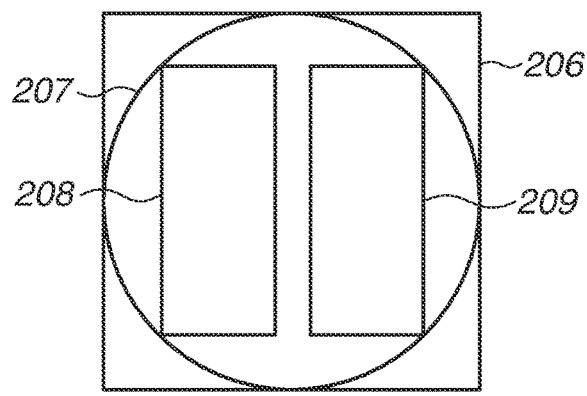

FIG. 3A illustrates a circuit diagram of the image sensor 5112 and FIG. 3B illustrates an exemplary configuration of a pixel portion of the image sensor 5112 according to the first exemplary embodiment. The image sensor 5112 illustrated in FIG. 3A includes a pixel alignment section 201 in which a plurality of pixels is arranged in a two-dimensional array pattern, a vertical selection circuit 202 that can select a row of the pixel alignment section 201, and a horizontal selection circuit 204 that can select a column of the pixel alignment section 201. Further, the image sensor 5112 includes a reading circuit 203 that can read a signal of a pixel portion (i.e., one of a plurality of pixel portions of the pixel alignment section 201) selected by the vertical selection circuit 202 and a serial interface 205 that externally determines an operation mode of each circuit. The reading circuit 203 includes a memory storing a signal, a gain amplifier, and an AD converter for each column. Although not illustrated, the image sensor 5112 includes a timing generator or a control circuit that provides timing signals to the vertical selection circuit 202, the horizontal selection circuit 204, and the signal reading circuit 203. Typically, the vertical selection circuit 202 sequentially selects a plurality of rows of the pixel alignment section 201 and the reading circuit 203 reads the signal of each selected row. The horizontal selection circuit 204 sequentially selects a plurality of pixel signals read by the reading circuit 203 for each column.

FIG. 3B illustrates an exemplary configuration of each pixel portion included in the image sensor 5112 according to the first exemplary embodiment. Each pixel portion 206 includes one microlens 207. Further, each pixel portion 206 includes a pair of photodiodes 208 and 209 that can realize AF on an imaging surface according to the phase difference detection method. Hereinafter, the photodiode may be referred to as "PD" or "photoelectric conversion portion". The photodiode has a photoelectric conversion function of converting received light into an electric signal. In addition to the illustrated constituent elements, each pixel portion further includes a signal amplifier that causes the reading circuit 203 to read a PD signal, a selection switch that can select a row, and a reset switch that can reset the PD signal, although not illustrated in the drawing.

FIG. 4 illustrates an exemplary configuration of the pixel alignment section 201. To provide a two-dimensional image, the pixel alignment section 201 includes a plurality of pixel portions (each having the configuration illustrated in FIG. 3B) arranged in a two-dimensional array pattern. A pixel portion 301, a pixel portion 302, a pixel portion 303, and a pixel portion 304 correspond to the above-mentioned pixel portion 206. PD 301L, PD 302L, PD 303L, and PD 304L correspond to the PD 208 illustrated in FIG. 3B. PD 301R, PD 302R, PD 303R, and PD 304R correspond to the PD 209 illustrated in FIG. 3B.

Exemplary light reception by the image sensor 5112 having the configuration illustrated in FIG. 4 will be described in detail below with reference to FIG. 5.

Figure 5:
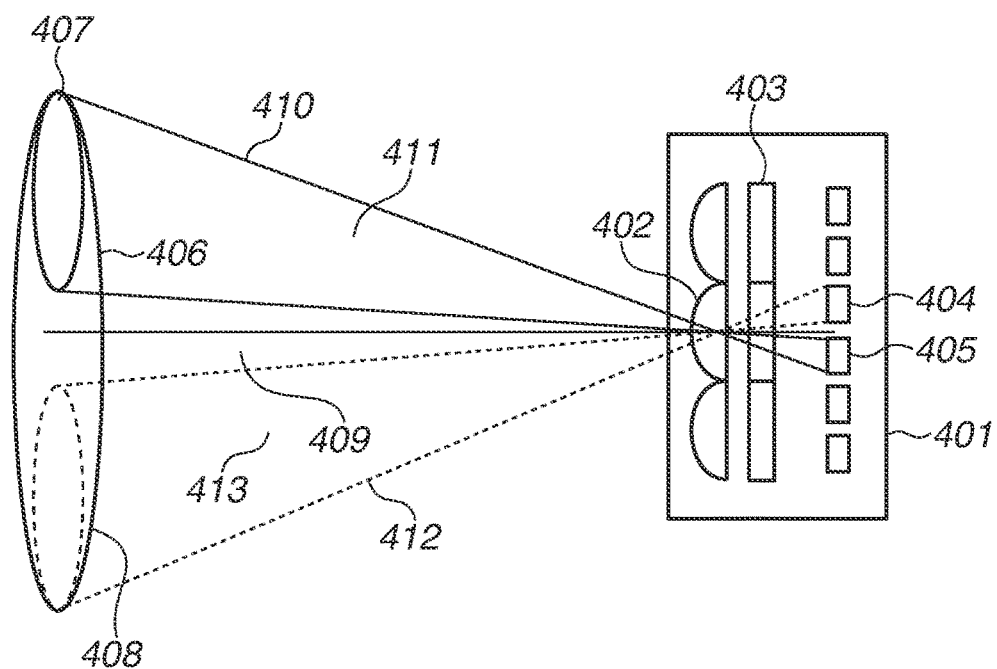
FIG. 5 schematically illustrates light reception by the image sensor and a focal point detection by the image sensor according to a phase difference detection method.

FIG. 5 illustrates a light flux that has passed through an exit pupil of the photographing lens 5101 and enters the PD of a pixel portion provided in the image sensor 5112. The image sensor 5112 has a cross section 401. A microlens 402 corresponds to the microlens 207 illustrated in FIG. 3B. Each pixel portion included in the image sensor 5112 is associated with a color filter 403. More specifically, a plurality of R, G, and B color filters are arranged according to, for example, the Bayer array. PD 404 is a photodiode corresponding to the PD 208 illustrated in FIG. 3B. PD 405 is a photodiode corresponding to the PD 209 illustrated in FIG. 3B.

In the following description, it is assumed that the pixel portion including the microlens 402 is a pixel portion positioned on an optical axis 409 that coincides with the center of a light flux having passed through an exit pupil 406. The light having a central axis coinciding with the optical axis 409 enters the image sensor 5112 after passing through the exit pupil 406. A pupil region 407 and a pupil region 408 are partial regions of the exit pupil of the photographing lens 5101. A beam 410 (or 411) is an outermost peripheral beam of the light that has passed through the pupil region 407. A beam 412 (or 413) is an outermost peripheral beam of the light that has passed through the pupil region 408. As understood from the illustration, the light flux having passed through the pupil region 407 (i.e., a part of the light flux emitted through the exit pupil 406) enters the PD 405 and the light flux having passed through the pupil region 408 (i.e., another part of the light flux emitted through the exit pupil 406) enters the PD 404. More specifically, the PD 404 and the PD 405 receive light fluxes having passed through different regions of the exit pupil 406. More specifically, there is a parallax between the light flux received by the PD 404 and the light flux received by the PD 405.

As mentioned above, the camera can obtain images of different regions of the exit pupil of the photographing lens 5101 on the imaging surface of the image sensor. Therefore, realizing the AF on the imaging surface according to the phase difference detection method is feasible.

The image sensor 5112 is constituted by A-line pixels that receive the light flux having passed through the pupil region 408 (see FIG. 5) and B-line pixels that receive the light flux having passed through the pupil region 407, which are arranged in a two-dimensional pattern. According to the example illustrated in FIG. 4, if an attentional row is a row 305, a line "A" (i.e., an image "A") can be formed by adding respective signals obtainable through the photoelectric conversion performed by PD 301L, PD 302L, PD 303L, and PD 304L. Similarly, a line "B" (i.e., an image "B") can be formed by adding respective signals obtainable through the photoelectric conversion performed by PD 301R, PD 302R, PD 303R, and PD 304R. Regarding the output of lines "A" and "B", the interval between two images is variable depending on the focusing state (e.g., in-focus state, front focus state, or back focus state). Therefore, the focus adjustment includes moving the focusing lens of the photographing lens in such a way as to equalize the image interval with an in-focus state interval. More specifically, the camera can calculate and obtain the moving amount (i.e., the defocus amount) of the focusing lens based on a deviation amount between two images. According to the above-mentioned configuration in which each pixel portion includes two PDs associated with one microlens, the camera can acquire a signal required to generate a recording image (i.e., a recording image signal) by adding the signals obtainable through the photoelectric conversion performed by respective PDs.

Although two images (lines "A" and "B") are derived from neighboring pixel portions in the above-mentioned example, it will be desired to constitute the image sensor with pixel portions including the same color filters. Further, although not described in detail, a conventionally known method is employable to perform the processing for driving the lens based on the deviation amount between two images.

In FIG. 5, a centroid interval (hereinafter, referred to as "base length") between the pupil region 407 and the pupil region 408 of the photographing lens 5101 is variable depending on the aperture value. When the aperture value is larger, the base length according to the phase difference detection method is shorter compared to the case where the aperture value is smaller. If the base length is shorter, a signal waveform required to obtain the phase difference will be greatly influenced by noises, compared to the case where the base length is longer. The accuracy will decrease in acquiring the focal point detection result. Further, in a case where a blurred degree of focus becomes larger, the influence of noises becomes greater correspondingly. Accordingly, in the present exemplary embodiment, the aperture value is taken into consideration in determining whether to use the signal acquired by the image sensor 5112 in the focal point detection (as described in detail below).

In the example described with reference to FIGS. 3 to 5, each pixel portion includes two PDs associated with one microlens. However, the above-mentioned effects of the present exemplary embodiment will be obtained even when the number of a plurality of PDs associated with one microlens is not two.

Further, as another example, the image sensor can be configured to include a plurality of pixel portions each including an offset PD located on one side and another plurality of pixel portions each including an offset PD located on the other side. Effects similar to those described above will be obtained.

[Configuration of Focal Point Detection Optical System]

Figure 6:
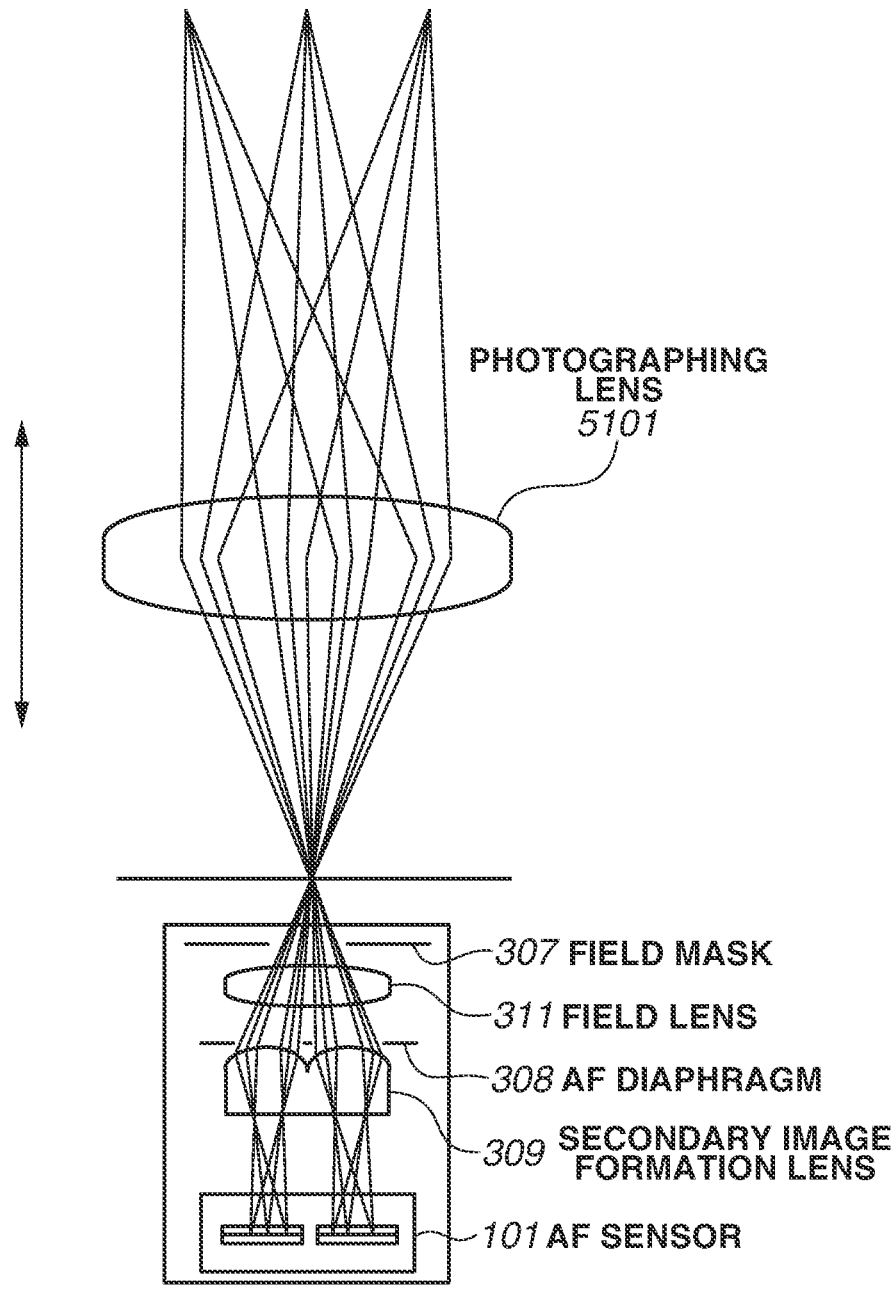
FIG. 6 illustrates an exemplary configuration of a focal point detection optical system.

FIG. 6 illustrates an exemplary configuration of a focal point detection optical system. A light flux from an imaging target passes through the photographing lens 5101 (i.e., a simply expressed lens in FIG. 6) and enters the focal point detection unit 6210 after the flux is reflected on the sub mirror 5107. An image of the light flux is once formed at a portion adjacent to the field mask 307 that is conjugated with the imaging surface. FIG. 6 illustrates a developed optical path of the light flux having been reflected on the sub mirror 5107 and folded back. The field mask 307 is a member capable of shielding useless light reaching to a region other than a focal point detection region on the screen.

The field lens 311 has a function of forming an image of each aperture portion of the AF aperture 308 at a portion adjacent to the exit pupil 406 of the photographing lens 5101. The secondary image formation lens 309 is disposed behind the AF aperture 308 and is constituted by a pair of lenses. Each lens of the secondary image formation lens 309 corresponds to each aperture portion of the AF aperture 308. Each light flux having passed through the field mask 307, the field lens 311, the AF aperture 308, and the secondary image formation lens 309 forms an image on a corresponding line sensor included in the AF sensor 101 (i.e., a second image sensor). The AF sensor 101 includes numerous line sensors, although only one pair of line sensors is illustrated in FIG. 6. According to the above-mentioned configuration, the AF sensor 101 can acquire focal point detection signals between which a parallax is present. As another exemplary configuration, the AF sensor 101 can include area sensors that are comparable to the above-mentioned line sensors.

[Acquisition Timing of Focal Point Detection Signal]

Figure 7:
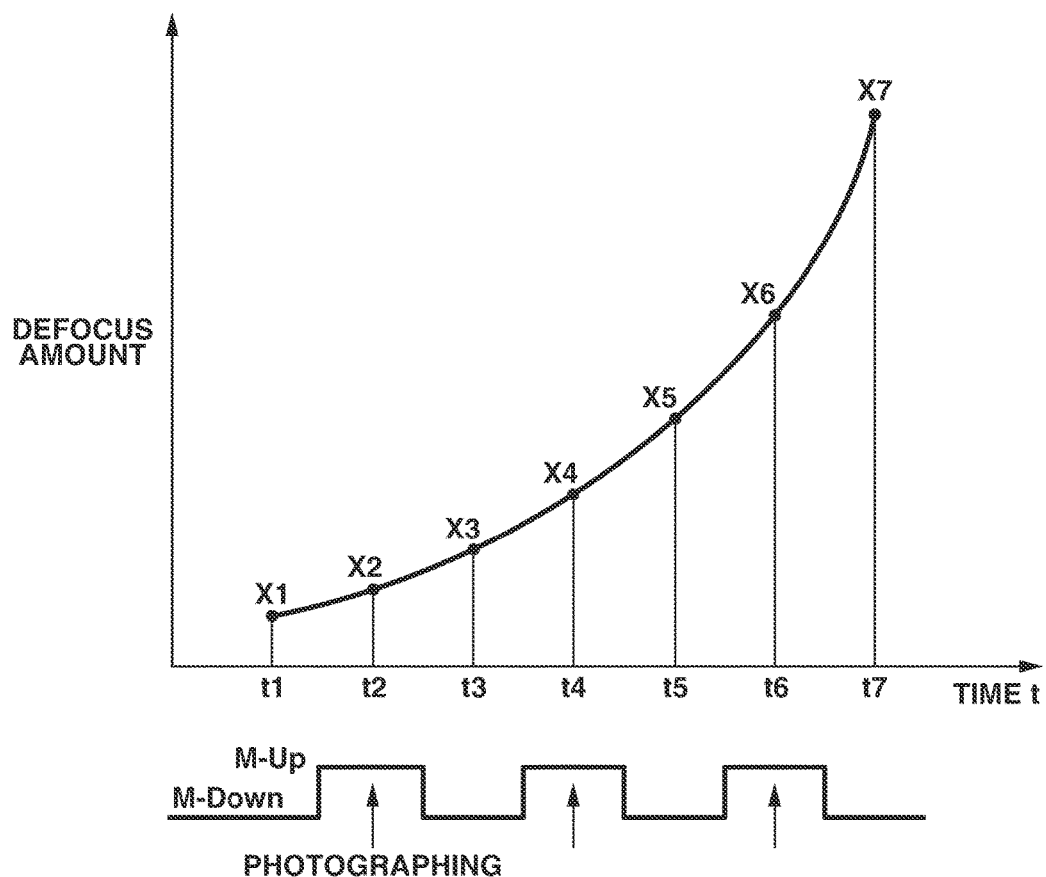
FIG. 7 illustrates timing of a focal point detection signal acquired by the image sensor and timing of a focal point detection signal acquired by an AF sensor.

FIG. 7 illustrates acquisition timing of a focal point detection signal by the image sensor 5112 and acquisition timing of a focal point detection signal by the AF sensor 101. In FIG. 7, "M-Up" indicates the photographing state where the main mirror 5106 retracts from the photographing optical path. In this state, the image sensor 5112 can perform an image capturing operation if the focal plane shutter 5110 is opened. The state where the image capturing operation is feasible means that the image sensor 5112 can acquire the focal point detection signal. On the other hand, "M-Down" indicates the finder observation state where the main mirror 5106 is positioned on the photographing optical path and kept in the inclined state. In this state, the sub mirror 5107 guides the light flux having transmitted through the main mirror 5106 toward the focal point detection unit 6210. Therefore, the AF sensor 101 can acquire the focal point detection signal. FIG. 7 illustrates three frames acquired when the camera starts a continuous shooting operation at time t2. The defocus amount illustrated in FIG. 7 (see the vertical axis) represents a lens drive amount required to eliminate a defocused state of the photographing optical system, which can be calculated by the microcomputer 5123 with reference to the focal point detection signal. FIG. 7 illustrates an exemplary change of the focus position in a case where an imaging target approaches the imaging apparatus. In a continuous shooting operation, the camera alternately performs a focal point detection using the signal acquired by the image sensor 5112 and a focal point detection using the signal acquired by the AF sensor 101. More specifically, the camera performs the focal point detection using the signal acquired by the AF sensor 101 at times t1, t3, t5, and t7 and performs the focal point detection using the signal acquired by the image sensor 5112 at times t2, t4, and t6. As illustrated in the drawing, it is ideal that each focal point detection result coincides with a corresponding change of the focus position.

In the following exemplary embodiments, an exemplary method for using alternately acquired focal point detection results will be described in detail. As illustrated in FIG. 7, in a case where the focus position continuously shifts in such a way as to track a moving body, the method includes calculating a lens drive amount for the focus adjustment based on a moving body prediction calculation result that can be obtained by using polynomial expressions. The moving body prediction can be defined as predicting a future position of a moving imaging target. A momentary position of the image surface can be regarded as a practical imaging target position. For example, the camera can predict the future position of the imaging target by using an image surface movement function that expresses the movement of the imaging target in such a way as to adjust the focus, with reference to a plurality of previously acquired focal point detection results. Predicting the image surface position enables calculating a drive amount of the photographing lens required to adjust the focus on the imaging target. The imaging target position to be predicted is not limited to the image surface position. For example, a momentary distance of an imaging target can be regarded as the imaging target position. The moving body prediction calculation method using the polynomial expressions is conventionally known and therefore redundant description thereof will be avoided.

[Main Flow]

Figure 8:
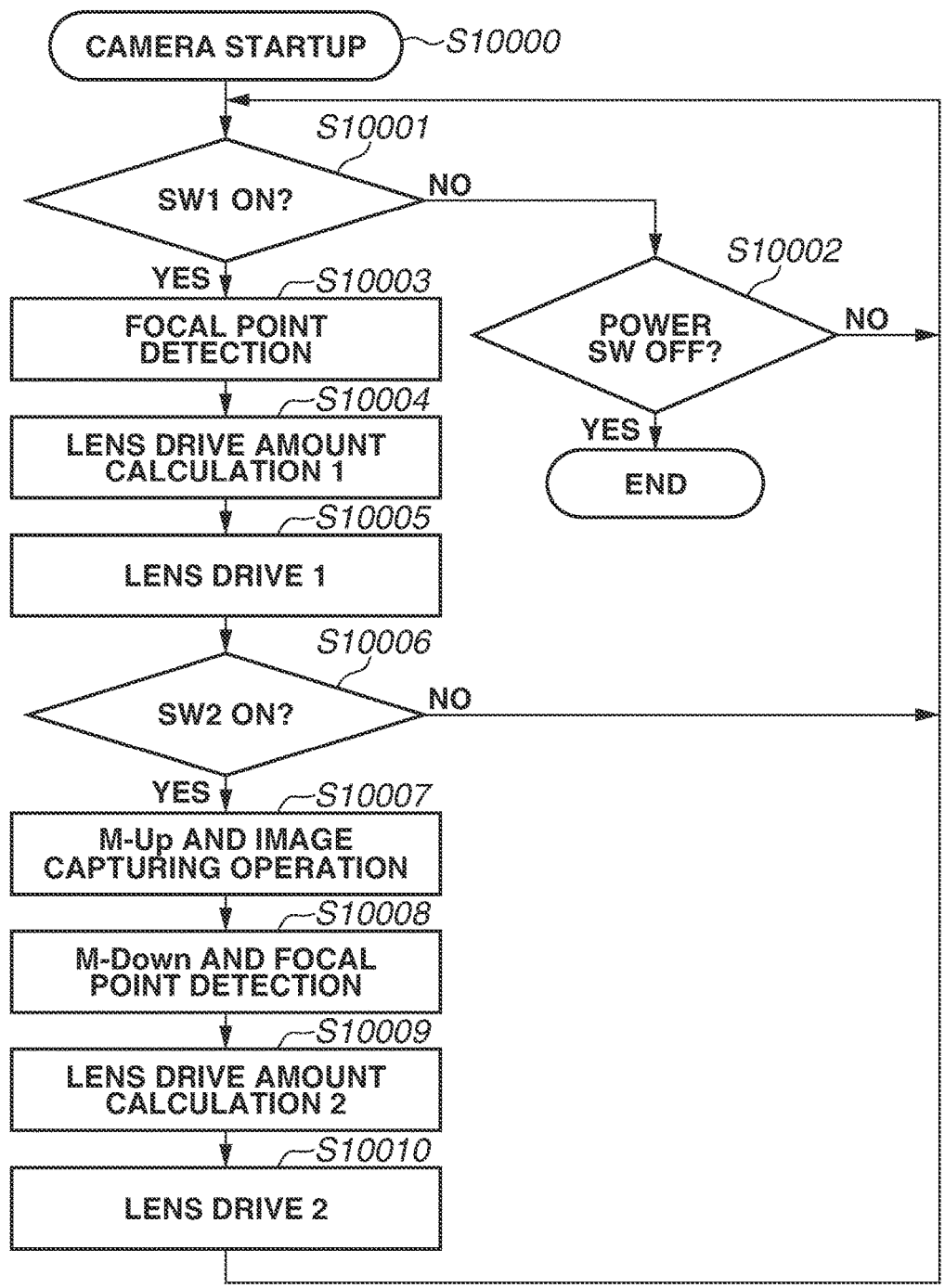
FIG. 8 is a flowchart illustrating an exemplary flow of photographing processing according to a first exemplary embodiment.

Hereinafter, a main flow according to the first exemplary embodiment will be described with reference to FIG. 8. FIG. 8 illustrates an exemplary flow of photographing processing according to the first exemplary embodiment.

In the present exemplary embodiment, it is assumed that the camera performs a continuous shooting operation while the photographing lens tracks a moving imaging target. In the present exemplary embodiment, the continuous shooting is continuously performing a plurality of photographing operations to acquire recording images.

If the camera turns on, then in step S10000, the microcomputer 5123 starts an operation. In step S10001, the microcomputer 5123 checks the operational state of the switch SW1. If it is determined that the switch SW1 is not ON (No in step S10001), the operation proceeds to step S10002. In step S10002, the microcomputer 5123 checks the operational state of the power switch. If it is determined that the power switch is OFF (Yes in step S10002), the microcomputer 5123 terminates the processing of the flowchart illustrated in FIG. 8. If it is determined that the power switch is ON (No in step S10002), the operation returns to step S10001 in which the microcomputer 5123 checks the operational state of the switch SW1 again.

If it is determined that the switch SW1 is ON (Yes in step S10001), the microcomputer 5123 controls the main mirror 5106 in such a way as to be positioned on the photographing optical path in the inclined state. A part of the light flux having passed through the photographing lens 5101 is reflected on the main mirror 5106 and guided toward the pentaprism 5108 (i.e., a constituent component of the finder) . In other words, the camera is brought into the finder observation state. Further, a part of the light flux having passed through the photographing lens 5101 passes through the main mirror 5106 and is reflected on the sub mirror 5107 so that the light flux can be guided toward the focal point detection unit 6210.

In step S10003, the microcomputer 5123 (i.e., a focal point detection unit) performs focal point detection (i.e., defocus amount calculation) processing with reference to the signal obtained by the AF sensor 101 of the focal point detection unit 6210. The microcomputer 5123 stores a focal point detection result (i.e., a defocus amount), together with focal point detection time, in the memory 5120 (i.e., a storage unit).

In step S10004, the microcomputer 5123 performs a lens drive amount calculation 1. First, the microcomputer 5123 determines whether to use the defocus amount calculated in step S10003 or a defocus amount calculated by using a signal acquired by the image sensor 5112 at timing earlier than step S10003 as a defocus amount to be used in a lens drive 1. Then, the microcomputer 5123 calculates a required lens drive amount with reference to the selected defocus amount, considering the movement of the imaging target. The lens drive amount calculation can be defined as processing for calculating a lens drive amount required to adjust the focus on a moving imaging target with reference to a plurality of previously acquired focal point detection results. It is assumed that the timing of step S10003 is, for example, t3 illustrated in FIG. 7. In this case, the timing of calculating the defocus amount based on the signal acquired by the image sensor 5112 is t2 illustrated in FIG. 7. Further, the lens drive amount calculation based on the selected defocus amount will be described in detail below with reference to a sub flow.

In step S10005, the microcomputer 5123 (i.e., a control unit) controls the lens drive 1 (i.e., main driving) in such a way as to adjust the focus for an image capturing operation to be performed in step S10007, based on the result obtained in step S10004.

Subsequently, in step S10006, the microcomputer 5123 determines whether the switch SW2 is ON, namely, determines whether a user requests the image capturing operation. If it is determined that the switch SW2 is not ON (No in step S10006), the operation returns to step S10001, in which the microcomputer 5123 checks the operational state of the switch SW1, again.

On the other hand, if the microcomputer 5123 determines that the switch SW2 is ON (Yes in step S10006), the operation proceeds to step S10007. In step S10007, the microcomputer 5123 causes the image sensor 5112 to perform the image capturing operation by controlling the main mirror 5106 to retract from the photographing optical path and opening the focal plane shutter 5110. The signal acquired through the above-mentioned image capturing operation is usable to generate a recording image.

In step S10008, the microcomputer 5123 controls the main mirror to return to the finder observation state where the main mirror is positioned on the photographing optical path in the inclined state. Then, the microcomputer 5123 (i.e., the focal point detection unit) performs focal point detection (i.e., defocus amount calculation) processing with reference to the signal acquired by the image sensor 5112 in the image capturing operation of step S10007. The microcomputer 5123 stores an acquired focal point detection result (i.e., a defocus amount), together with focal point detection time, in the memory 5120 (i.e., the storage unit).

Subsequently, in step S10009, the microcomputer 5123 performs a lens drive amount calculation 2. More specifically, the microcomputer 5123 determines whether to use the focal point detection result acquired in step S10003 or the focal point detection result acquired in step S10008 in a lens drive 2 to be performed in step S10010 and/or determines a ratio in using the selected focal point detection result, as described in detail below with reference to a sub flow.

In step S10010, the microcomputer 5123 (i.e., the control unit) performs the lens drive 2 (i.e., supplementary driving). The lens drive 2 can be defined as lens drive for increasing the accuracy of focal point detection to be next performed in step S10003. When the imaging target is moving, performing only the lens drive 1 (i.e., the main driving) may not be effective to track the imaging target accurately although it depends on the movement of the imaging target. This is the reason why the microcomputer 5123 performs the above-mentioned supplementary driving.

In the above-mentioned exemplary embodiment, the same microcomputer 5123 is used as the microcomputer (i.e., the control unit) that performs the lens drive 1 in step S10005 and the microcomputer that performs the lens drive 2 in step S10010. However, the control unit that performs the lens drive 1 and the control unit that performs the lens drive 2 can be different from each other.

If the microcomputer 5123 completes the lens drive 2 in step S10010, the operation returns to step S10001 in which the microcomputer 5123 checks the operational state of the switch SW1 again.

As mentioned above, the processing according to the present exemplary embodiment includes two kinds of focal point detections, i.e., the focal point detection using the signal acquired by the image sensor 5112 and the focal point detection using the signal acquired by the AF sensor 101.

The signal acquired by the image sensor 5112 can be used not only for the generation of a recording image but also for the generation of a focal point detection signal. Therefore, in a case where the signal from the image sensor 5112 is available, it is unnecessary to specially acquire the focal point detection signal because the focal point detection signal can be simultaneously acquired when an image capturing operation is performed to generate a recording image. A photographing operation for acquiring a signal from the image sensor 5112 is performed immediately before the lens drive 2. Accordingly, the signal acquired in the photographing operation can be directly used for the focal point detection and can be applied to the lens drive 2. Therefore, in the lens drive 2, the camera can acquire a result newer than the focal point detection result obtained in step S10003 without performing any signal acquisition for the focal point detection.

Further, the processing according to the present exemplary embodiment includes two kinds of focus adjustment operations. The first focus adjustment operation is the lens drive 1 to be performed before the image capturing operation to drive the lens to an in-focus position for successful photographing. The second focus adjustment operation is the lens drive 2 to be performed after completing the image capturing operation and before starting the next focal point detection using a signal acquired by the AF sensor 101. The lens drive 2 intends to preliminarily drive the photographing lens before starting the next lens drive 1, so that the photographing lens is positioned adjacent to the in-focus position when the focal point detection using the signal acquired by the AF sensor 101 is performed. If the imaging target is a quickly moving object, performing only the lens drive 1 may be insufficient to track the imaging target accurately. In such a case, additionally performing the lens drive 2 is effective to track the quickly moving object accurately. As a result, it becomes feasible to perform the focal point detection accurately.

In this case, if only the focal point detection result obtainable from the AF sensor 101 is available, it has been necessary to calculate lens drive amounts at different timings by using the same focal point detection result in both the lens drive amount calculation 1 and the lens drive amount calculation 2.

On the other hand, in the present exemplary embodiment, not only the signal acquired by the AF sensor 101 but also the signal acquired by the image sensor 5112 (i.e., the signal to be used in the generation of a recording image) are usable in the focal point detection. Further, according to the present exemplary embodiment, as mentioned above, a photographing signal (i.e., a recording image generation signal) is usable as the focal point detection signal. More specifically, the camera can acquire the focal point detection signal without performing any special acquisition operation. Using the recording image generation signal as the focal point detection signal is useful in that the lens drive amount calculation 2 can use the latest focal point detection result because a signal newer than the signal acquired by the AF sensor 101 is available without increasing the number of times of signal acquisition. Therefore, the moving imaging target can be accurately tracked.

[Sub Flow of Lens Drive Amount Calculation 1 (FIG. 9)]

As mentioned above, the lens drive 1 to be performed in step S10005 is preliminary focus adjustment for an image capturing operation to be performed in step S10007. Accordingly, it is desired to use the defocus amount calculated in the latest focal point detection (see step S10003) in calculating the lens drive amount for the lens drive 1 (see step S10005). If there is a longer time interval between the calculation timing of the defocus amount to be used in the lens drive amount calculation and the actual lens driving timing, accurately tracking the imaging target becomes difficult although it depends on the moving speed or the moving direction of the imaging target.

On the other hand, there is a problem in using the focal point detection result obtainable from the signal acquired by the AF sensor 101 (i.e., the second image sensor), as described in detail below with reference to FIG. 15.

Figure 15:
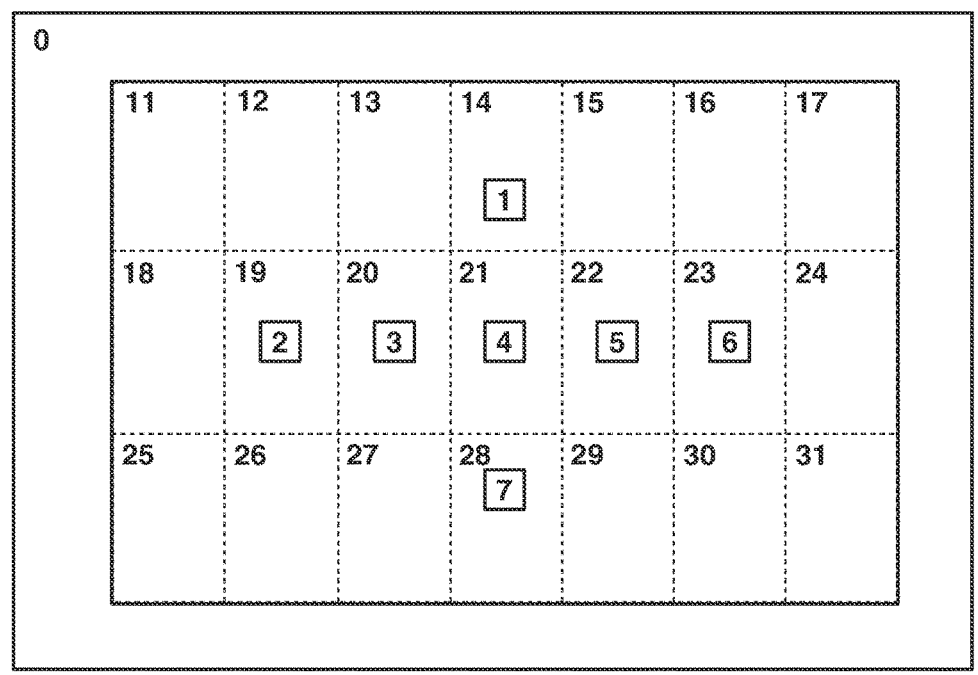
FIG. 15 illustrates a positional relationship between a focal point detection region of the AF sensor and a focal point detection region of the image sensor.

FIG. 15 illustrates a focal point detection region (i.e., seven regions 1 through 7) using the AF sensor 101 (i.e., the second image sensor) and a focal point detection region (i.e., twenty-one regions 11 through 31) using the image sensor 5112 (i.e., the first image sensor) in relation to the entire surface (0) of the image sensor, in a state of the photographing screen observed from the eyepiece lens 6204 of the finder. As understood from the drawing, the focal point detection region using the image sensor 5112 (i.e., the first image sensor) is generally wider than the focal point detection region using the AF sensor 101, because of a physical restriction of the sub mirror 6209 (or 5107) in a case where the AF sensor 101 is used in the focal point detection.

Accordingly, even when the imaging target deviates from the focal point detection region using the AF sensor 101, the camera can track continuously the imaging target by using the focal point detection result obtainable from the image sensor 5112 (i.e., the first image sensor) if the imaging target remains in the focal point detection region using the image sensor 5112.

Figure 9:
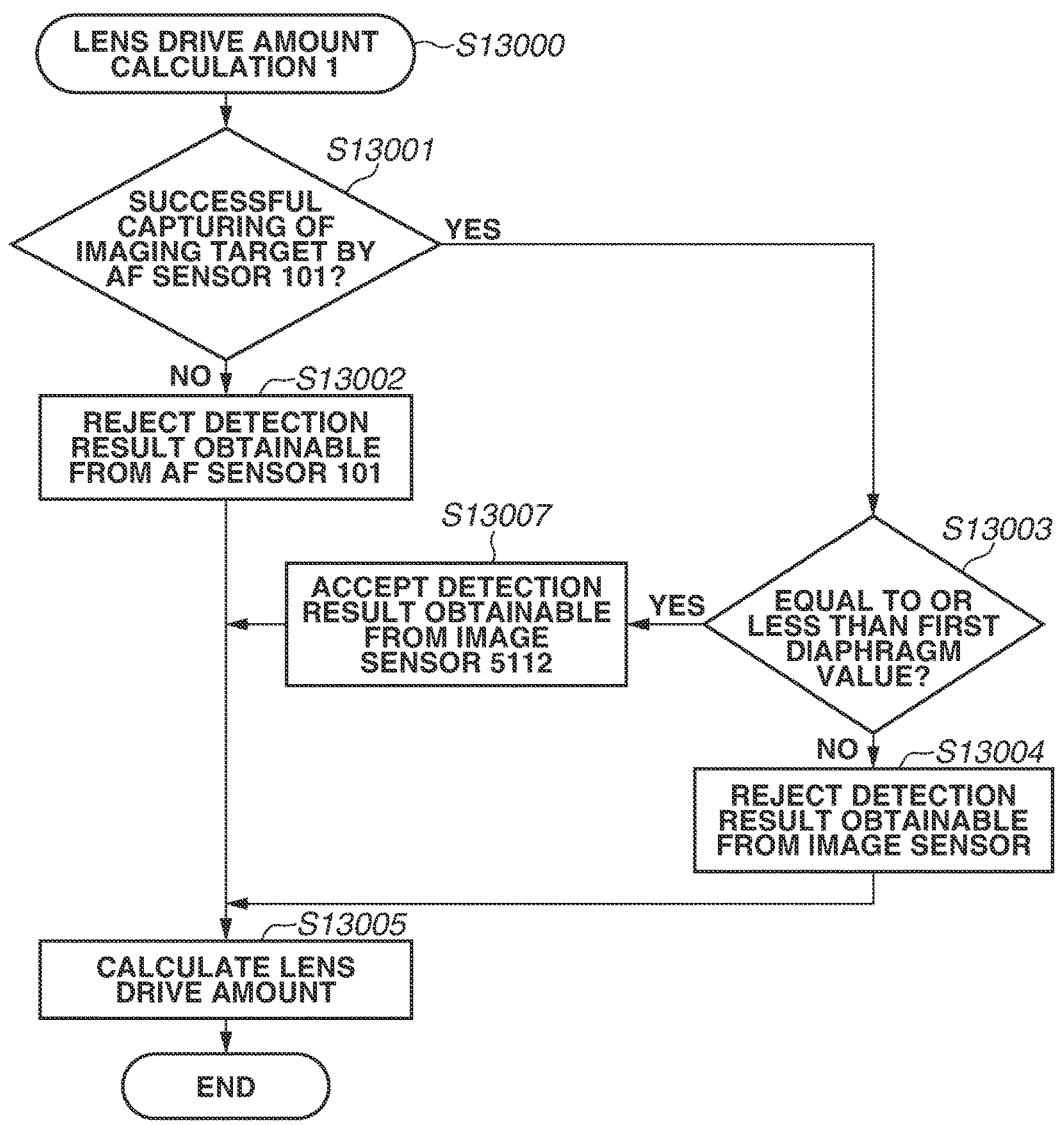
FIG. 9 is a flowchart illustrating a processing flow of a lens drive amount calculation 1 according to the first exemplary embodiment.

Considering the above-mentioned background, a lens drive amount calculation 1 according to the present exemplary embodiment will be described with reference to a flowchart illustrated in FIG. 9. The lens drive amount calculation 1 is processing for calculating the lens drive amount to be used in the lens drive 1 (see step S10005), which is performed between the focal point detection using the AF sensor 101 (see step S10003) and the lens drive 1 (see step S10005).

In step S13000, the microcomputer 5123 starts the lens drive amount calculation 1. The microcomputer 5123 determines whether to calculate the present lens drive amount by using a cooperation of the focal point detection result obtainable from the signal acquired by the image sensor 5112 (i.e., the first image sensor) and the focal point detection result obtainable from the signal acquired by the AF sensor 101 (i.e., the second image sensor).

In step S13001, the microcomputer 5123 determines whether the camera can capture the present imaging target with reference to the focal point detection result obtainable from the signal acquired by the AF sensor 101 (i.e., the second image sensor). For example, the microcomputer 5123 refers to the reliability of the signal acquired by the AF sensor 101 in the determination of step S13001. If the reliability is higher, the microcomputer 5123 determines that the capturing of the imaging target is successful. On the other hand, if the reliability is lower, the microcomputer 5123 determines that the capturing of the imaging target is failed. Further, the microcomputer 5123 can refer to an actually calculated image shift amount (or an actually calculated defocus amount). If the image shift amount can be calculated, the microcomputer 5123 determines that the capturing of the imaging target is successful. On the other hand, if the image shift amount cannot be calculated, a microcomputer 5123 determines that the capturing of the imaging target is failed. Further, the microcomputer 5123 can be configured to determine whether a present focal point detection result obtainable from the signal acquired by the AF sensor 101 (i.e., the second image sensor) corresponds to a mathematical function calculated based on previously acquired focal point detection results. If it is determined that the present focal point detection result obtainable from the signal acquired by the AF sensor 101 (i.e., the second image sensor) corresponds to the mathematical function calculated based on previously acquired focal point detection results, the microcomputer 5123 determines that the capturing of the imaging target is successful. Otherwise, the microcomputer 5123 determines that the capturing of the imaging target is filed. The microcomputer 5123 can refer to at least one of the above-mentioned plurality of items in the determination of step S13001.

If it is determined that the capturing of the imaging target in the focal point detection region of the AF sensor 101 (i.e., the second image sensor) is failed (No in step S13001), then in step S13002, the microcomputer 5123 rejects the focal point detection result obtainable from the AF sensor 101 in the present calculation. Subsequently, the operation proceeds to step S13005. In step S13005, the microcomputer 5123 calculates a lens drive amount based on the focal point detection result (i.e., the defocus amount) obtainable from the signal acquired by the image sensor 5112. More specifically, in a case where the information from the AF sensor 101 is not usable in the capturing of the imaging target, the microcomputer 5123 uses only the focal point detection result obtainable from the image sensor 5112 in calculating the lens drive amount. In this case, the microcomputer 5123 (i.e., a prediction unit) performs a moving body prediction calculation with reference to the focal point detection result selected in the above-mentioned flow and a plurality of previously acquired focal point detection results. The microcomputer 5123 calculates the lens drive amount based on the moving body prediction calculation result.

On the other hand, if the microcomputer 5123 determines that the capturing of the imaging target in the focal point detection region of the AF sensor 101 is successful (Yes in step S13001), the operation proceeds to step S13003. In step S13003, the microcomputer 5123 determines whether the aperture value of the photographing optical system is equal to or less than a first aperture value when the recording image signal (i.e., the signal usable as the focal point detection signal) is previously acquired by the image sensor 5112. Through the above-mentioned processing, the microcomputer 5123 determines whether both the focal point detection result obtainable by using the AF sensor 101 and the focal point detection result obtainable by using the image sensor 5112 are usable. If it is determined that the aperture value is equal to or less than the first aperture value (Yes in step S13003), then in step S13007, the microcomputer 5123 (i.e., a first determination unit) determines that the camera can detect the focal point based on the focal point detection result obtainable from the signal acquired by the image sensor 5112. Compared to the case where the aperture value is smaller, the focal point detection accuracy decreases with increasing aperture value. Accordingly, if the operation proceeds to step S13005, the microcomputer 5123 calculates a lens drive amount based on both the focal point detection result obtainable by using the AF sensor 101 and the focal point detection result obtainable by using the image sensor 5112. More specifically, the microcomputer 5123 performs a moving body prediction calculation with reference to the above-mentioned two focal point detection results and a plurality of previously acquired focal point detection results. Then, the microcomputer 5123 calculates the lens drive amount based on the moving body prediction result.

On the other hand, if the microcomputer 5123 (i.e., the first determination unit) determines that the aperture value is greater than the first aperture value (No in step S13003), then in S13004, the microcomputer 5123 determines to use the focal point detection result obtainable from the signal acquired by the AF sensor 101. More specifically, the microcomputer 5123 rejects the focal point detection result obtainable from the signal acquired by the image sensor 5112 (i.e., the focal point detection result obtained in the previous step S10008). Then, in step S13005, the microcomputer 5123 performs a moving body prediction calculation with reference to the above-mentioned focal point detection result and a plurality of previously acquired focal point detection results and calculates the lens drive amount based on the moving body prediction calculation result.

[Effects Brought by Sub Flow of Lens Drive Amount Calculation 1 (FIG. 9)]

As mentioned above, the processing flow illustrated in FIG. 9 is characterized by basically using the latest focal point detection result (i.e., the focal point detection result obtainable from the signal acquired by the AF sensor 101) and, if necessary, using the focal point detection result obtainable from the signal acquired by the image sensor 5112.

Preferentially using the latest focal point detection result (i.e., the focal point detection result obtainable from the signal acquired by the AF sensor 101) is useful in realizing the lens drive amount calculation based on the latest focal point detection result.

Further, occasionally using the focal point detection result obtainable from the signal acquired by the image sensor 5112 if necessary is useful in realizing the lens drive amount calculation based on a relatively new focal point detection result, compared to a case where such an occasional usage is not taken into consideration.

Further, in a case where the AF sensor 101 is inappropriate to capture an imaging target, accurately tracking the imaging target is feasible with reference to the focal point detection result obtainable from the signal acquired by the image sensor 5112.

[Sub Flow of Lens Drive Amount Calculation 2 (FIG. 10)]

Hereinafter, a sub flow of the lens drive amount calculation 2 according to the present exemplary embodiment will be described in detail below with reference to FIG. 10. The lens drive amount calculation 2 is processing for calculating the lens drive amount to be used in the lens drive 2 (see step S10010), which is performed between the image capturing operation (see step S10007) and the lens drive 2 (see step S10010).

Figure 10:
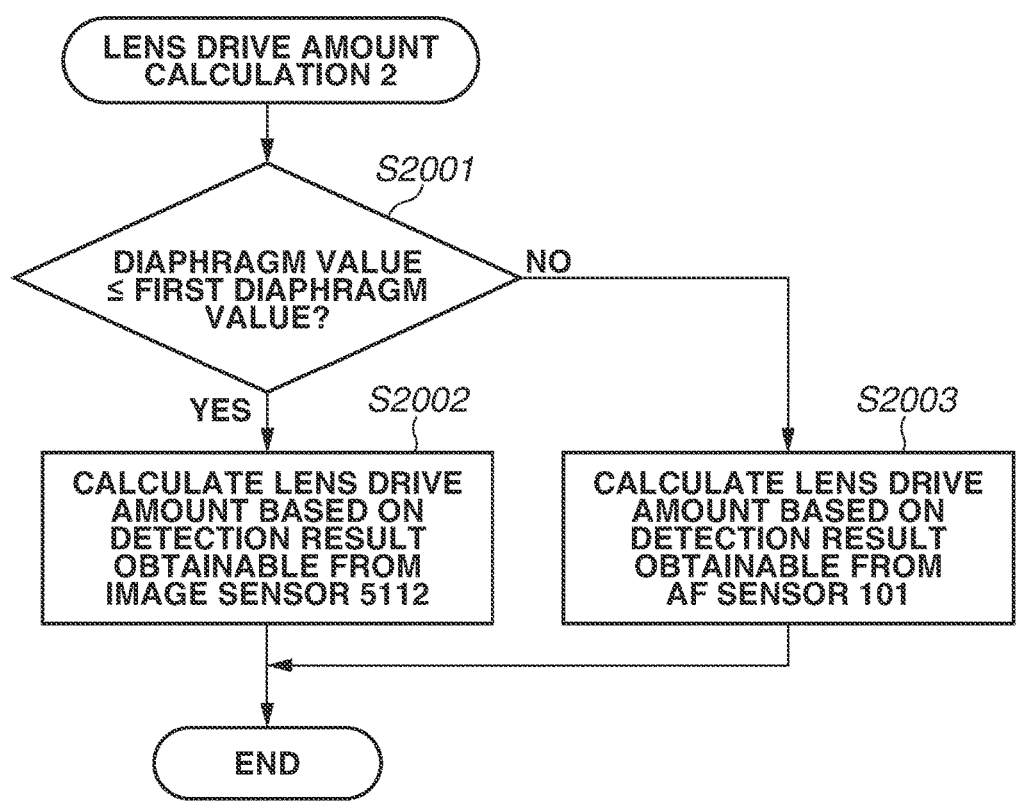
FIG. 10 is a flowchart illustrating a processing flow of a lens drive amount calculation 2 according to the first exemplary embodiment.

In the processing flow illustrated in FIG. 10, the aperture value of the photographing optical system is taken into consideration. In performing the focus adjustment operation, the microcomputer 5123 checks the aperture value to determine whether to use the focal point detection result obtainable from the signal acquired by the image sensor 5112 or the focal point detection result obtainable from the signal acquired by the AF sensor 101.

In step S2001, the microcomputer 5123 determines whether the aperture value of the photographing optical system is equal to or less than the first aperture value when the focal point detection signal is acquired from the image sensor 5112. If the microcomputer 5123 (i.e., the first determination unit) determines that the aperture value is equal to or less than the first aperture value (Yes in step S2001), the operation proceeds to step S2002. In step S2002, the microcomputer 5123 calculates a lens drive amount based on the focal point detection signal acquired by the image sensor 5112. This is because the focal point detection result obtainable from the signal acquired by the image sensor 5112 (see step S10008) is newer than the focal point detection result obtainable from the signal acquired by the AF sensor 101 (see step S10003) at the timing of the lens drive amount calculation 2. Further, the focal point detection accuracy can be secured satisfactorily when the aperture value is equal to or less than the first aperture value.

On the other hand, if the microcomputer 5123 (i.e., the first determination unit) determines that the aperture value is greater than the first aperture value (No in step S2001), the operation proceeds to step S2003. In step S2003, the microcomputer 5123 calculates a lens drive amount based on the focal point detection result obtainable from the signal acquired by the AF sensor 101. This is because the focal point detection accuracy decreases with increasing aperture value, compared to the case where the aperture value is smaller, as mentioned above. Using a relatively older focal point detection result (see step S10003) is useful if the accuracy is reliable, rather than using an inaccurate focal point detection result obtained lately.

It is desired to determine the threshold value of the aperture value used in the above-mentioned determination according to the present exemplary embodiment according to each focal point detection apparatus or each imaging apparatus.

[Effects Brought by Sub Flow of Lens Drive Amount Calculation 2 (FIG. 10)]

As mentioned above, the processing flow illustrated in FIG. 10 is characterized by determining whether to use the focal point detection result obtainable from the signal acquired by the image sensor 5112 or the focal point detection result obtainable from the signal acquired by the AF sensor 101, with reference to the first aperture value, in calculating the lens drive amount for the lens drive 2. Through the above-mentioned processing, the camera can use the focal point detection result obtainable from the signal acquired by the image sensor 5112 (i.e., the focal point detection obtained at the latest timing) if the focal point detection accuracy is acceptable.

Further, in a case where the focal point detection result obtainable from the signal acquired by the image sensor 5112 is not accurate enough, the camera can calculate the lens drive amount with reference to the accurate focal point detection result obtainable from the signal acquired by the AF sensor 101.

According to the present exemplary embodiment, the signal acquired by the image sensor 5112 in a photographing operation (i.e., the signal usable for image recording) is not only used for the focal point detection but also used in calculating the drive amount of the photographing lens 5101 in the lens drive 2. Because the signal acquired in the photographing operation can be used for the generation of a recording image (i.e., primary object) and for the focal point detection, the camera can perform focal point detection processing without specially acquiring a focal point detection signal. Further, the camera can use a relatively new focal point detection result, compared to a case where the focal point detection result is obtained from the signal acquired by the AF sensor 101 (see step S10003). Therefore, accurately tracking the imaging target is feasible. The camera can perform highly accurate focal point detection when the imaging target can be accurately tracked, compared to a case where the imaging target tracking accuracy is low.

Further, as mentioned above, in the present exemplary embodiment, the microcomputer 5123 performs a moving body prediction calculation and calculates a lens drive amount based on a moving body prediction result. The moving body prediction includes obtaining an image surface movement function expressing the movement of an imaging target based on previously acquired focal point detection results and predicting a future image surface position of the imaging target according to the obtained mathematical function. More specifically, a mathematical function reflecting the movement of an imaging target accurately can be obtained if the number of available focal point detection results is larger, rather than using a smaller number of focal point detection results. In the present exemplary embodiment, the total number of focal point detection results increases compared to a case where the moving body prediction is performed based on only the focal point detection result obtainable from the signal acquired by the AF sensor 101 (see step S10003). Through the above-mentioned processing, the accuracy of the moving body prediction can be improved and therefore the camera can track the imaging target accurately.

Hereinafter, a second exemplary embodiment of the present invention will be described in detail below with reference to FIG. 11. The second exemplary embodiment includes components or portions similar to those described in the first exemplary embodiment. Only characteristic features not described in the first exemplary embodiment will be described in detail below. The present exemplary embodiment is different from the first exemplary embodiment in the sub flow of the lens drive amount calculation 2.

[Sub Flow of Lens Drive Amount Calculation 2 (FIG. 11)]

Hereinafter, a processing flow of the lens drive amount calculation 2 according to the present exemplary embodiment will be described in detail below with reference to FIG. 11. The processing flow illustrated in FIG. 11 corresponds to the flow in FIG. 10 in the first exemplary embodiment. The processing flow of FIG. 10 selectively uses either the focal point detection result obtainable from the signal acquired by the image sensor 5112 or the focal point detection result obtainable from the signal acquired by the AF sensor 101 according to the first aperture value. On the other hand, the processing flow of FIG. 11 is characterized by constantly using the focal point detection result obtained from the signal acquired by the AF sensor 101 irrespective of the aperture value.

In step S1001, the microcomputer 5123 (i.e., the first determination unit) determines whether the aperture value of the photographing optical system is equal to or less than the first aperture value (e.g., F8) at the timing the focal point detection signal is acquired by the image sensor 5112 (see step S10007). If the aperture value is equal to or less than the first aperture value (Yes in step S1001), the microcomputer 5123 determines that the focal point detection result obtainable from the signal acquired by the image sensor 5112 is sufficiently accurate. Subsequently, in step S1002, the microcomputer 5123 calculates a lens drive amount with reference to both the focal point detection result obtainable from the signal acquired by the image sensor 5112 and the focal point detection result obtainable from the signal acquired by the AF sensor 101. On the other hand, if the microcomputer 5123 (i.e., the first determination unit) determines that the aperture value is greater than the first aperture value (No in step S1001), the operation proceeds to step S1003. In step S1003, the microcomputer 5123 calculates a lens drive amount with reference to only the focal point detection result obtainable from the signal acquired by the AF sensor 101. The moving body prediction calculation result obtained by the microcomputer 5123 is usable in the calculation of the lens drive amount.

[Effects Brought by Sub Flow of Lens Drive Amount Calculation 2 (FIG. 11)]

Figure 11:
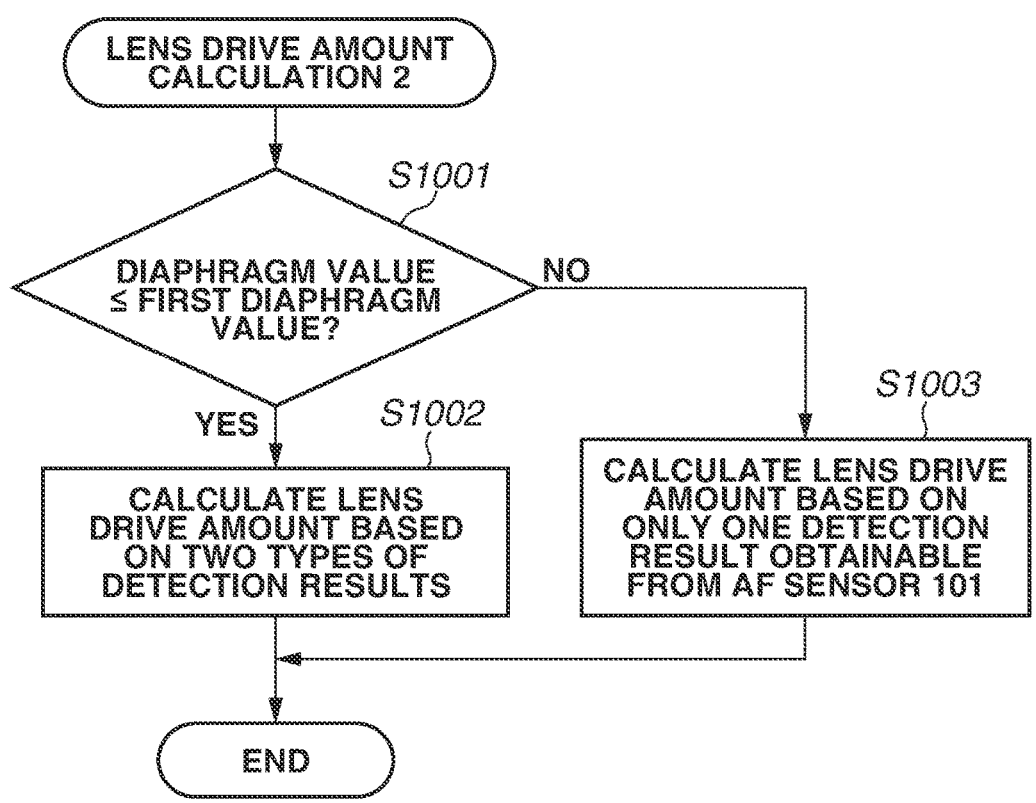
FIG. 11 is a flowchart illustrating a processing flow of the lens drive amount calculation 2 according to a second exemplary embodiment.

As mentioned above, according to the processing flow illustrated in FIG. 11, the camera can perform lens driving processing with reference to a relatively new focal point detection result because the focal point detection result is obtainable from the signal acquired by the image sensor 5112 when the aperture value is in an acceptable range. Through the above-mentioned processing, the camera can track the imaging target accurately.

[Application of Sub Flow of Lens Drive Amount Calculation 2 (FIG. 11) to Lens Drive 1 and Effects]

The processing flow illustrated in FIG. 11 can be applied not only to the lens drive amount calculation 2 to be performed in step S10009 but also to the lens drive amount calculation 1 to be performed in step S10004. Because the focal point detection result obtainable from the signal acquired by the AF sensor 101 is constantly used when the aperture value is greater than the first aperture value and when the aperture value is equal to or less than the first aperture value, the lens drive amount calculation using the latest focus adjustment result (see step S10003) can be realized. Further, even if the AF sensor 101 is inappropriate to capture a specific imaging target, accurately tracking such a target is feasible if the aperture value is equal to or less than the first aperture value, more specifically, in a case where the focal point detection result obtainable from the signal acquired by the image sensor 5112 is available. Further, occasionally using the focal point detection result obtainable from the signal acquired by the image sensor 5112 is useful in realizing the lens drive amount calculation based on relatively new focal point detection results.

Hereinafter, a third exemplary embodiment of the present invention will be described with reference to FIG. 12. The third exemplary embodiment includes components or portions similar to those described in the first exemplary embodiment. Only characteristic features not described in the first exemplary embodiment will be described in detail below. The present exemplary embodiment is different from the first exemplary embodiment in the sub flow of the lens drive amount calculation 2.

[Sub Flow of Lens Drive Amount Calculation 2 (FIG. 12)]

In the above-mentioned exemplary embodiments, the microcomputer 5123 determines whether to use the focal point detection result obtainable from the signal acquired by the image sensor 5112 with reference to the threshold value of the first aperture value. The third exemplary embodiment is different from the above-mentioned exemplary embodiments in that a second aperture value (e.g., F5) is provided as additional threshold value. Further, third exemplary embodiment is characterized by setting an appropriate weighting factor according to the aperture value in the image capturing operation (see step S10007) and multiplying the determined weighting factor with the focal point detection result obtainable from the signal acquired by the image sensor 5112 to be uses in the lens drive amount calculation.

Figure 12:
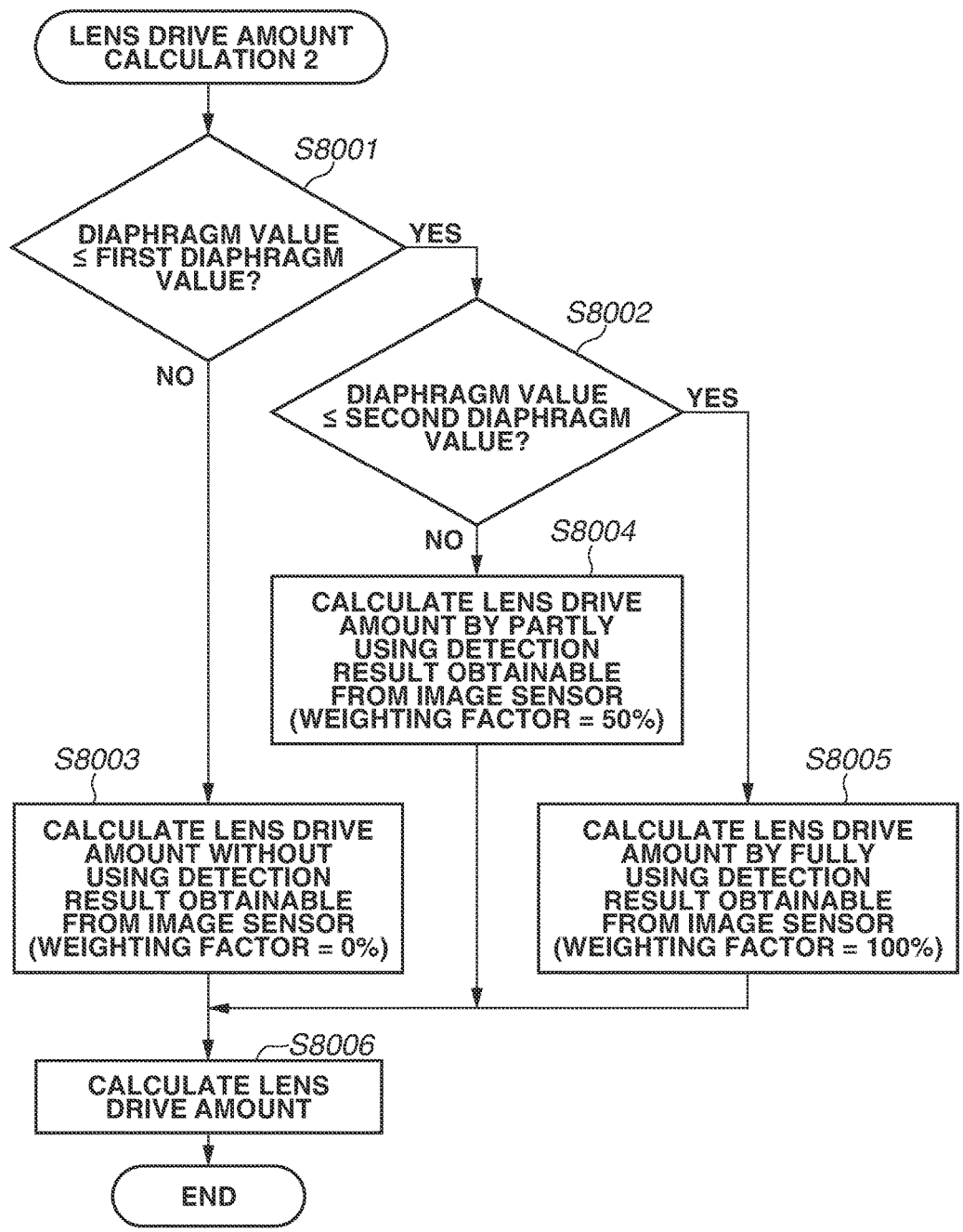
FIG. 12 is a flowchart illustrating a processing flow of the lens drive amount calculation 2 according to a third exemplary embodiment.

FIG. 12 is a flowchart illustrating exemplary processing of the lens drive amount calculation 2 according to the present exemplary embodiment. If α represents a weighting factor, X represents a calculation result obtainable by directly using two types of focal point detection results, and Y represents a calculation result obtainable by using only the detection result obtainable from the signal acquired by the AF sensor 101, a final calculation result Z can be defined in the following manner.

$$Z\alpha = (\alpha \times X + (1-\alpha) \times Y)/2 \quad \text{(Formula 1)}$$

Weighting factor 100%: $\alpha=1$, and weighting factor 0%: $\alpha=0$

In step S8001, the microcomputer 5123 determines whether the aperture value of the photographing optical system is equal to or less than the first predetermined value in the image capturing operation (see step S10007), more specifically, at the timing the focal point detection signal is acquired by the image sensor 5112. If the microcomputer 5123 (i.e., the first determination unit) determines that the aperture value is greater than the first aperture value (No in step S8001), it is believed that the focal point detection result obtainable from the signal acquired by the image sensor 5112 is not accurate enough. In this case, in step S8003, the microcomputer 5123 sets a weighting factor 0% for the result obtained from the image sensor 5112.

On the other hand, if it is determined that the aperture value is equal to or less than the first aperture value (Yes in step S8001), then in step S8002, the microcomputer 5123 (i.e., the first determination unit) determines whether the aperture value is equal to or less than the second aperture value. In the present exemplary embodiment, the first aperture value and the second aperture value satisfy a relationship "first aperture value>second aperture value". If it is determined that the aperture value is equal to or less than the second aperture value (Yes in step S8002), then in step S8005, the microcomputer 5123 (i.e., the first determination unit) sets a weighting factor 100% for the focal point detection result obtainable from the signal acquired by the image sensor 5112. Because of the above-mentioned relationship between the first aperture value and the second aperture value, it is believed that a longer base length can be secured and therefore the accuracy of the focal point detection result is excellent when the aperture value is the second aperture value, compared to the first aperture value.

On the other hand, if it is determined that the aperture value is greater than the second aperture value (No in step S8002), then in step S8004, the microcomputer 5123 (i.e., the first determination unit) sets an intermediate weighting factor 50% for the result obtained from the image sensor 5112. Although the determination result in step S8001 indicates that the aperture value is equal to or less than the first aperture value, carefully using both the focal point detection result obtained from the signal acquired by the image sensor 5112 and the focal point detection result obtained from the signal acquired by the AF sensor 101 in the lens drive amount calculation is appropriate in this case.

In step S8006, the microcomputer 5123 calculates the present defocus amount $Z\alpha$ considering the weighting factor determined for the focal point detection result (i.e., the defocus amount) obtainable from the signal acquired by the image sensor 5112 as mentioned above. The microcomputer 5123 uses the calculated defocus amount $Z\alpha$ in the calculation of the lens drive amount.

[Effects Brought by Sub Flow of Lens Drive Amount Calculation 2 (FIG. 12)]

As mentioned above, the processing according to the present exemplary embodiment includes changing the weighting factor to be applied to the focal point detection result obtainable from the signal acquired by the image sensor 5112 considering not only the first aperture value but also the second aperture value (first aperture value>second aperture value). Precisely determining the aperture value of the photographing optical system is useful for the microcomputer 5123 to finely classify the focal point detection result to be used in the calculation of the lens drive amount according to the aperture value. In a case where higher accuracy improvement is expected, it is desired to preferentially use the focal point detection result obtainable from the signal acquired by the image sensor 5112, namely the focal point detection result obtained relatively lately at the timing earlier than the lens drive 2 (see step S10010). If the aperture value is greater than the first aperture value, it is useful to use the focal point detection result obtained in step S10003 to secure sufficient accuracy in the focal point detection, although the detection timing is not so close compared to that of the focal point detection obtained in step S10008. If the aperture value is equal to or less than the first aperture value and greater than the second aperture value, it is useful to use both the focal point detection result obtained in step S10003 and the focal point detection result obtained in step S10008 to appropriately secure satisfactory accuracy in the focal point detection and set acceptable focal point detection timing. From the reasons described above, the processing according to the present exemplary embodiment enables the camera to track an imaging target accurately. Using the focal point detection result obtainable from the image sensor in the calculation for the present focus adjustment operation as mentioned above is useful to improve the accuracy.

[Application of Sub Flow of Lens Drive Amount Calculation 2 (FIG. 12) to Lens Drive 1 and Effects]

The application of the processing flow illustrated in FIG. 12 is not limited to the lens drive amount calculation 2 (see step S10009). For example, the processing flow illustrated in FIG. 12 can be applied to the lens drive amount calculation 1 (see step S10004). In a case where the focal point detection result obtainable from the signal acquired by the image sensor 5112 is available, the camera can track an imaging target accurately by preferentially using the focal point detection result obtainable from the signal acquired by the AF sensor 101, even when the AF sensor 101 is inappropriate to capture the imaging target.

Figure 13:
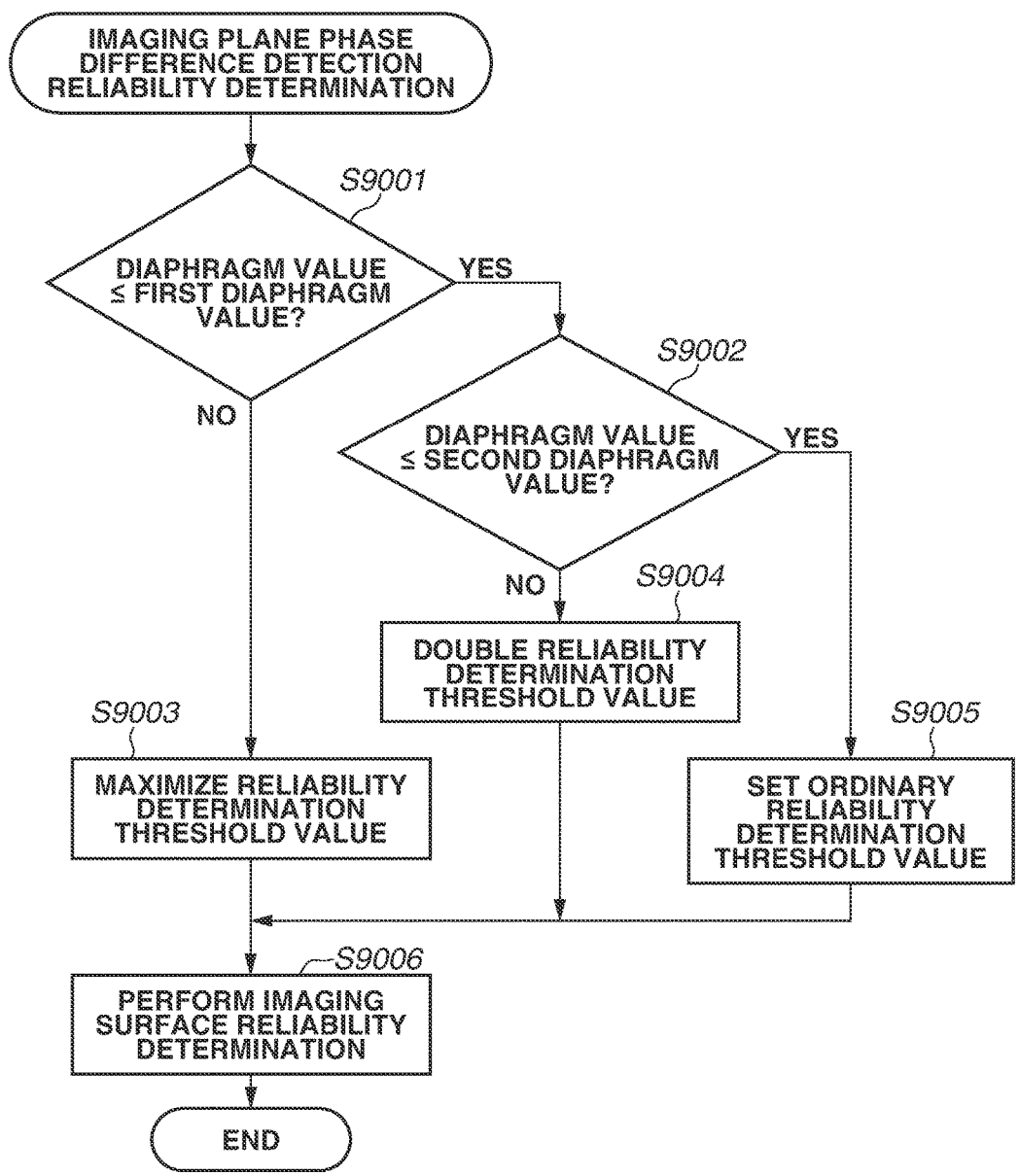
FIG. 13 is a flowchart illustrating a processing flow of an imaging plane phase difference detection reliability determination according to a fourth exemplary embodiment.

Hereinafter, a fourth exemplary embodiment of the present invention will be described in detail below with reference to FIG. 13. The fourth exemplary embodiment includes components or portions similar to those described in the first exemplary embodiment. Only characteristic features not described in the first exemplary embodiment will be described in detail below.

[Sub Flow of an Imaging Plane Phase Difference Detection Reliability Determination (FIG. 13)]

In the above-mentioned exemplary embodiments, the aperture value is taken into consideration when the microcomputer 5123 changes the usage rate of each of the focal point detection result obtainable from the signal of the image sensor 5112 and the focal point detection result obtainable from the signal of the AF sensor 101. The fourth exemplary embodiment is characterized in that the microcomputer 5123 changes a threshold value to be employed in determining the reliability of the focal point detection result obtainable from the image sensor 5112 according to the aperture value. The reliability determination can be performed according to a conventionally known method for determining whether the focal point detection result is appropriate, for example, with reference to the contrast of the focal point detection signal. More specifically, the sub flow illustrated in FIG. 13 is unique in that the aperture value is taken into consideration.

The microcomputer 5123 performs the processing of the sub flow according to the present exemplary embodiment after completing the focal point detection using the image sensor 5112 (see step S10008) and before starting the lens drive amount calculation (see step S10009).

This intends to improve the accuracy in the focal point detection at the stage where the signal of the image sensor 5112 is used for the focal point detection.

In step S9001, the microcomputer 5123 determines whether the aperture value of the photographing optical system is equal to or less than the first aperture value when the signal is acquired by the image sensor 5112 in the image capturing operation (see step S10007). If it is determined that the aperture value is greater than the first aperture value (No in step S9001), then in step S9003, the microcomputer 5123 (i.e., the first determination unit) sets a maximum value as a reliability determination threshold value to be employed in the focal point detection calculation using the signal acquired by the image sensor 5112. More specifically, the microcomputer 5123 determines that the signal acquired by the image sensor 5112 is constantly unreliable from the viewpoint of the focal point detection.

On the other hand, if the microcomputer 5123 (i.e., the first determination unit) determines that the aperture value is equal to or less than the first aperture value (Yes in step S9001), the operation proceeds to step S9002. In step S9002, the microcomputer 5123 (i.e., the first determination unit) determines whether the aperture value is equal to or less than the second aperture value. If it is determined that the aperture value is equal to or less than the second aperture value (YES in step S9002), then in step S9005, the microcomputer 5123 sets a predetermined threshold value (i.e., an ordinary value) as the reliability determination threshold value to be employed in the focal point detection calculation using the signal acquired by the image sensor 5112.

On the other hand, if it is determined that the aperture value is greater than the second aperture value (No in step S9002), then in step S9004, the microcomputer 5123 (i.e., the first determination unit) doubles the reliability determination threshold value to be employed in the focal point detection calculation using the image sensor because careful processing is suitable in this case.

In step S9006, the microcomputer 5123 (i.e., a second determination unit) performs reliability determination processing using the reliability determination threshold value determined as mentioned above, when it acquires the focal point detection result based on the present signal acquired by the image sensor 5112. If an evaluation value of the focal point detection result obtainable from the image sensor 5112 is greater than the reliability determination threshold value, the microcomputer 5123 (i.e., the second determination unit) determines that the focal point detection result obtainable from the image sensor 5112 is sufficiently reliable. If the evaluation value of the focal point detection result obtainable from the image sensor 5112 is equal to or less than the reliability determination threshold value, the microcomputer 5123 (i.e., the second determination unit) determines that the focal point detection result obtainable from the image sensor 5112 is not reliable. The reliability determination itself is conventionally known and therefore redundant description thereof will be avoided.

[Application of Sub Flow of Lens Drive Amount Calculation 2 (FIG. 13) to Lens Drive 2 and Effects]

As mentioned above, the microcomputer 5123 determines the aperture value at the timing the focal point detection signal is acquired by the image sensor 5112 and differentiates the reliability determination threshold value to be used in the focal point detection calculation using the signal acquired by the image sensor 5112. As described above, the accuracy of the focal point detection using the image sensor 5112 is dissatisfactory when the aperture value is greater than the first aperture value, compared to the case where the aperture value is equal to or less than the first aperture value. Accordingly, in the sub flow illustrated in FIG. 13, the microcomputer 5123 sets the reliability determination threshold value in such a way as to increase the possibility of rejecting the focal point detection by the image sensor 5112 with increasing aperture value. The above-mentioned processing can improve the accuracy of the reliability determination. When the accuracy of the reliability determination is higher, the camera can calculate the lens drive amount accurately by using a reliable focal point detection result. Accordingly, the camera can track the imaging target accurately.

As described above, the camera can perform the common processing according to the common flow for the lens drive amount calculation 1 and the lens drive amount calculation 2. On the other hand, as described in a fifth exemplary embodiment described below, the camera can differentiate the processing in the lens drive amount calculation 1 and in the lens drive amount calculation 2 while employing the common flow.

Figure 14:
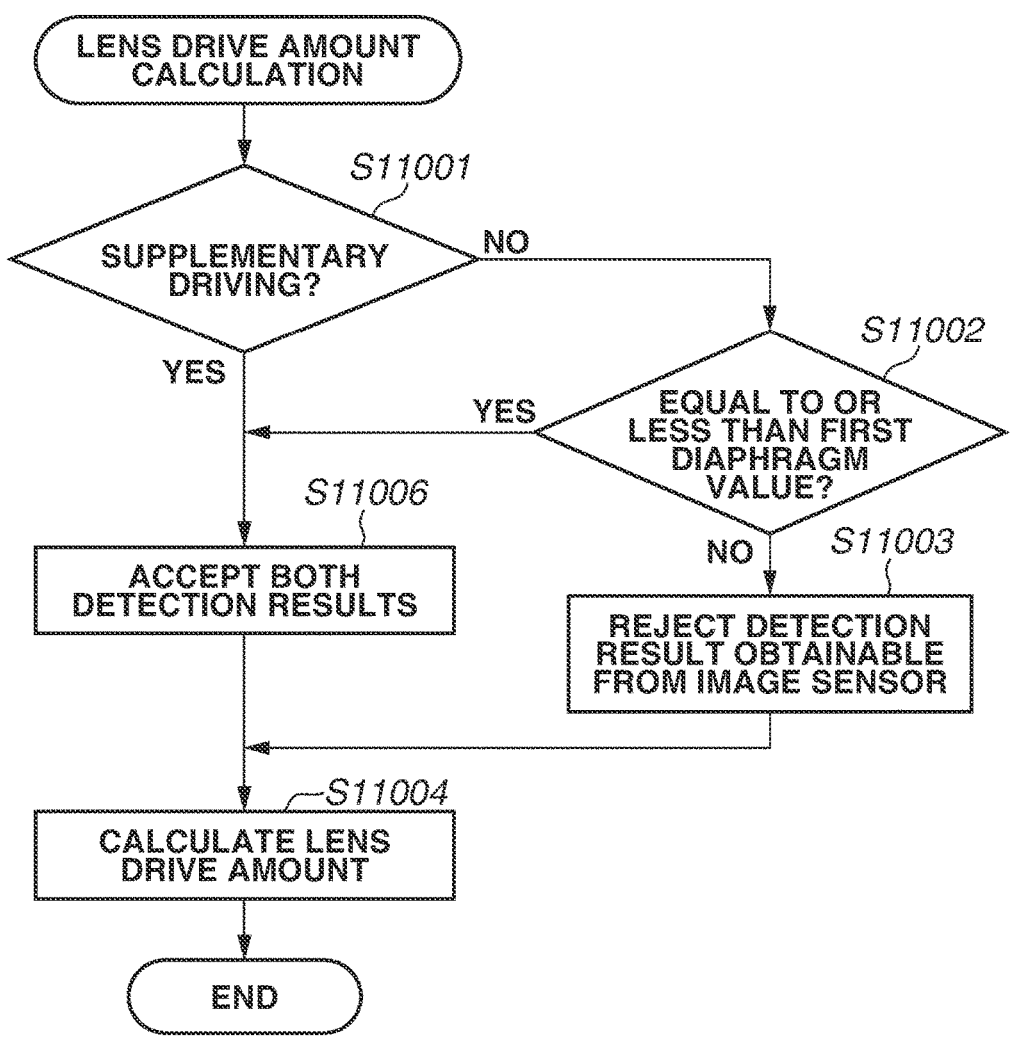
FIG. 14 is a flowchart illustrating a processing flow of the lens driving calculation according to a fifth exemplary embodiment.

Hereinafter, a processing flow of a lens driving calculation according to the fifth exemplary embodiment will be described with reference to FIG. 14. The fifth exemplary embodiment includes components and portions similar to those described in the first exemplary embodiment. Only characteristic features not described in the first exemplary embodiment will be described in detail below. The processing flow illustrated in FIG. 14 is applicable to the lens drive amount calculation 1 and the lens drive amount calculation 2.

In step S11001, the microcomputer 5123 determines whether the present lens driving is the lens drive 2 (i.e., the supplementary driving). If it is determined that the present lens driving is the lens drive 2 (Yes in step S11001), then in step S11006, the microcomputer 5123 determines to use a cooperation of the focal point detection result obtainable from the image sensor 5112 and the focal point detection result obtainable by using the AF sensor 101 in the calculation. Then, the operation proceeds to step S11004. If it is determined that the present lens driving is not the lens drive 2 (No in step S11001), more specifically, if it is determined that the present lens driving is the lens drive 1, the operation proceeds to step S11002. In step S11002, the microcomputer 5123 determines whether the aperture value of the photographing optical system is equal to or less than the first aperture value at the timing the focal point detection signal is obtained by the image sensor 5112. If the aperture value is equal to or less than the first aperture value (Yes in step S11002), the microcomputer 5123 (i.e., the first determination unit) determines that the focal point detection result obtainable from the image sensor 5112 is sufficiently accurate. Therefore, the operation proceeds to step S11006. In step S11006, the microcomputer 5123 determines to perform calculation processing by using a cooperation of both the focal point detection result obtainable by using the image sensor 5112 and the focal point detection result obtainable by using the AF sensor 101. Then, in step S11004, the microcomputer 5123 calculates a lens drive amount with reference to the above-mentioned cooperation of two focal point detection results. On the other hand, if the aperture value is greater than the first aperture value (No in step S11002), then in step S11003, the microcomputer 5123 determines to perform calculation processing by using only the focal point detection result obtainable by using the AF sensor 101. Subsequently, in step S11004, the microcomputer 5123 calculates the lens drive amount.

[Effects by Fifth Exemplary Embodiment]

As mentioned above, in the present exemplary embodiment, the camera can determine whether the target lens driving to be presently subjected to the lens drive amount calculation is the lens drive 2. Through the above-mentioned processing, the camera can appropriately use the focal point detection result obtainable from the image sensor and can differentiate the focal point detection result to be used in the lens drive amount calculation according to the purpose of each lens driving.

[Modified Embodiment]

In the above-mentioned lens drive amount calculation, the camera performs the moving body prediction calculation with reference to a plurality of previously acquired focal point detection results. As another example, the camera can obtain the lens drive amount by using only the focal point detection result selected through the above-mentioned flow instead of performing the moving body prediction calculation. In the main flow of the above-mentioned exemplary embodiment, the camera can perform two kinds of focal point detections during a single sequence. Therefore, the camera may be able to track a moving imaging target without performing the moving body prediction calculation although it depends on the moving speed or the moving direction of the imaging target.

Further, the camera uses the AF sensor 101 and the image sensor 5112 (i.e., the recording image acquisition sensor) as two sensors to be used in the focal point detection. However, as another exemplary embodiment, the imaging apparatus can be configured to include two image sensors comparable to the image sensor 5112. Even in such a case, the camera can obtain similar effects if the above-mentioned exemplary embodiment is applied.

Although some exemplary embodiments have been described, the present invention is not limited to the above-mentioned exemplary embodiments and can be applied to any other embodiments changed or modified within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006447, filed Jan. 15, 2016, which is hereby incorporated by reference herein in its entirety.

What is claimed is:

1. An imaging apparatus that continuously performs a plurality of photographing operations, the imaging apparatus comprising:
   a first image sensor configured to perform at least a first photographing operation and a second photographing operation successively to acquire a signal that can be used to generate a recording image, wherein the first image sensor includes a plurality of microlenses and a plurality of pixel portions each including a plurality of photoelectric conversion portions, wherein each of the plurality of pixel portions corresponds to each microlens;
   a second image sensor, which is different from the first image sensor, wherein the second image sensor receives a pair of light fluxes of an image re-formed on a predetermined focal plane of an imaging optical system;
   a focal point detection unit configured to perform first focal point detection processing and second focal point detection processing successively, wherein the first focal point detection processing is operated between the first photographing operation and the second focal point detection processing, and wherein the second focal point detection processing is operated between the first focal point detection processing and the second photographing operation, wherein the first focal point detection processing and the second focal point detection processing are calculation of defocus amount, wherein the second focal point detection processing is performed by calculating the defocus amount by using the focal point detection signal acquired from the second image sensor; and
   a processor configured to control a first lens drive for driving a focusing lens based on a result obtained through the first focal point detection processing, and control a second lens drive for driving the focusing lens based on a result obtained through the second focal point detection processing,
   wherein the first focal point detection processing is performed by using the signal acquired from the first image sensor in the first photographing operation, and
   wherein the second focal point detection processing is performed by using a focal point detection signal acquired from the second image sensor,
   wherein if an aperture value corresponding to the signal acquired from the first image sensor is equal to or less than a first aperture value, the processor controls the first lens drive based on a focal point detection result obtained through the first focal point detection processing.

2. The imaging apparatus according to claim 1, wherein if the aperture value corresponding to the signal acquired from the first image sensor is equal to or less than the first aperture value, the processor controls the first lens drive without using a focal point detection result obtained through the second focal point detection processing.

3. The imaging apparatus according to claim 1, wherein if the aperture value corresponding to the signal acquired from the first image sensor is equal to or less than the first aperture value, the processor controls the first lens drive based on both the focal point detection result obtained through the first focal point detection processing and a focal point detection result obtained through the second focal point detection processing.

4. The imaging apparatus according to claim 1, wherein if the aperture value corresponding to the signal acquired from the first image sensor is greater than the first aperture value, the processor controls the first lens drive based on a focal point detection result obtained through the second focal point detection processing.

5. The imaging apparatus according to claim 4, wherein if the aperture value corresponding to the signal acquired from the first image sensor is greater than the first aperture value, the processor controls the first lens drive without using the focal point detection result obtained through the first focal point detection processing.

6. The imaging apparatus according to claim 1, wherein if the aperture value corresponding to the signal acquired from the first image sensor is equal to or less than a second aperture value, the processor controls the first lens drive based on the focal point detection result obtained through the first focal point detection processing.

7. The imaging apparatus according to claim 6, wherein if the aperture value corresponding to the signal acquired from the first image sensor is equal to or less than the second aperture value, the processor controls the first lens drive without using a focal point detection result obtained through the second focal point detection processing.

8. The imaging apparatus according to claim 6, wherein if the aperture value corresponding to the signal acquired from the first image sensor is equal to or less than the first aperture value and is greater than the second aperture value, the processor controls the first lens drive based on both the focal point detection result obtained through the first focal point detection processing and a focal point detection result obtained through the second focal point detection processing.

9. The imaging apparatus according to claim 1, wherein in the second lens drive, the processor performs the control in such a way as to drive the focusing lens based on both the focal point detection result obtained through the first focal point detection processing and a focal point detection result obtained through the second focal point detection processing.

10. The imaging apparatus according to claim 1, wherein if the aperture value corresponding to the signal acquired from the first image sensor is equal to or less than the first aperture value, the processor controls the second lens drive based on both the focal point detection result obtained through the first focal point detection processing and a focal point detection result obtained through the second focal point detection processing.

11. The imaging apparatus according to claim 1, wherein if the aperture value corresponding to the signal acquired from the first image sensor is greater than the first aperture value, the processor controls the second lens drive based on a focal point detection result obtained through the second focal point detection processing.

12. The imaging apparatus according to claim 11, wherein if the aperture value corresponding to the signal acquired from the first image sensor is greater than the first aperture value, the processor controls the second lens drive without using the focal point detection result obtained through the first focal point detection processing.

13. The imaging apparatus according to claim 1, wherein if the second image sensor cannot capture an imaging target, the processor controls the second lens drive without using a focal point detection result obtained through the second focal point detection processing.

14. The imaging apparatus according to claim 13, wherein if an aperture value obtained when the second image sensor has acquired the signal is equal to or less than the first aperture value, the processor controls the second lens drive based on both the focal point detection result obtained through the first focal point detection processing and the focal point detection result obtained through the second focal point detection processing.

15. The imaging apparatus according to claim 14, wherein if the aperture value corresponding to the signal acquired from the first image sensor is greater than the first aperture value, the processor controls the second lens drive based on the focal point detection result obtained through the second focal point detection processing.

16. The imaging apparatus according to claim 1, further comprising a prediction unit configured to predict a future position of an imaging target with reference to a plurality of previously acquired focal point detection results,
wherein the processor controls the driving of the focusing lens based on a prediction result obtained by the prediction unit.

17. The imaging apparatus according to claim 16, wherein the prediction unit predicts a future image surface position corresponding to the imaging target as the future position of the imaging target.

18. The imaging apparatus according to claim 1, further comprising a second image sensor configured to determine reliability of a focal point detection result obtained through the first focal point detection processing according to a reliability determination threshold value,
wherein the second image sensor determines that the focal point detection result obtained through the first focal point detection processing is reliable if an evaluation value of the reliability of the focal point detection result obtained through the first focal point detection processing is greater than the reliability determination threshold value, and determines that the focal point detection result obtained through the first focal point detection processing is not reliable if the evaluation value of the reliability of the focal point detection result obtained through the first focal point detection processing is equal to or less than the reliability determination threshold value, and
the reliability determination threshold value is differentiated according to an aperture value corresponding to the signal acquired from the first image sensor.

19. The imaging apparatus according to claim 18, wherein a reliability determination threshold value to be set when an aperture value corresponding to the signal acquired from a first image sensor is greater than a first aperture value is greater than a reliability determination threshold value to be set when the aperture value is equal to or less than the first aperture value,
a reliability determination threshold value to be set when the aperture value is greater than the second aperture value is greater than a reliability determination threshold value to be set when the aperture value is equal to or less than the second aperture value, and
the first aperture value is greater than the second aperture value.

20. The imaging apparatus according to claim 18, wherein if an aperture value is equal to or less than a first aperture value, the processor controls the second lens drive based on a focal point detection result obtained through the second focal point detection processing.

21. The imaging apparatus according to claim 1, further comprising a first determination unit configured to determine the aperture value at the timing the signal is acquired from the first image sensor.

22. The imaging apparatus according to claim 1, wherein the processor performs a control in such a way as to drive the focusing lens according to a control value acquired by weighting the focal point detection result obtained through the first focal point detection processing and a focal point detection result obtained through the second focal point detection processing.

23. The imaging apparatus according to claim 1,
wherein the processor controls the first lens drive during an interval between the first focal point detection and the second focal point detection, and
wherein the processor controls the second lens drive during an interval between the second focal point detection processing and the second photographing operation.

24. A method for controlling an imaging apparatus that includes a first image sensor configured to perform at least a first photographing operation and a second photographing operation successively to acquire a signal that can be used to generate a recording image, wherein the first image sensor includes a plurality of microlenses and a plurality of pixel portions each including a plurality of photoelectric conversion portions, wherein each of the plurality of pixel portions corresponds to each microlens and a second image sensor different from the first image sensor, wherein the second image sensor receives a pair of light fluxes of an image re-formed on a predetermined focal plane of an imaging optical system, the method comprising:
performing first focal point detection processing and second focal point detection processing successively, wherein the first focal point detection processing is operated between the first photographing operation and the second focal point detection processing, and wherein the second focal point detection processing is operated between the first focal point detection processing and the second photographing operation, wherein the first focal point detection processing and the second focal point detection processing are calculation of defocus amount, wherein the second focal point detection processing is performed by calculating the defocus amount by using the focal point detection signal acquired from the second image sensor; and
controlling a first lens drive for driving a focusing lens based on a result obtained through the first focal point detection processing, and controlling a second lens drive for driving the focusing lens based on a result obtained through the second focal point detection processing,
wherein the first focal point detection processing is performed by using the signal acquired from the first image sensor in the first photographing operation, and
wherein the second focal point detection processing is performed by using a focal point detection signal acquired from the second image sensor, wherein if an aperture value corresponding to the signal acquired from the first image sensor is equal to or less than a first aperture value, the processor controls the first lens drive based on a focal point detection result obtained through the first focal point detection processing.

25. A non-transitory storage medium storing a program that causes a computer to control an imaging apparatus that includes a first image sensor configured to perform at least a first photographing operation and a second photographing operation successively to acquire a signal that can be used to generate a recording image, wherein the first image sensor includes a plurality of microlenses and a plurality of pixel portions each including a plurality of photoelectric conversion portions, wherein each of the plurality of pixel portions corresponds to each microlens and a second image sensor that is different from the first image sensor, wherein the second image sensor receives a pair of light fluxes of an image re-formed on a predetermined focal plane of an imaging optical system, the program comprising:
  computer-executable instructions for performing first focal point detection processing and second focal point detection processing successively, wherein the first focal point detection processing is operated between the first photographing operation and the second focal point detection processing, and wherein the second focal point detection processing is operated between the first focal point detection processing and the second photographing operation, wherein the first focal point detection processing and the second focal point detection processing are calculation of defocus amount, wherein the second focal point detection processing is performed by calculating the defocus amount by using the focal point detection signal acquired from the second image sensor; and
  computer-executable instructions for controlling a first lens drive for driving focusing lens based on a result obtained through the first focal point detection processing, and controlling a second lens drive for driving the focusing lens based on a result obtained through the second focal point detection processing,
  wherein the first focal point detection processing is performed by using the signal acquired from the first image sensor in the first photographing operation, and
  wherein the second focal point detection processing is performed by using a focal point detection signal acquired from the second image sensor,
  wherein if an aperture value corresponding to the signal acquired from the first image sensor is equal to or less than a first aperture value, the processor controls the first lens drive based on a focal point detection result obtained through the first focal point detection processing.

* * * * *